(12) United States Patent
Takeuchi et al.

(10) Patent No.: US 11,022,674 B2
(45) Date of Patent: Jun. 1, 2021

(54) VEHICLE SURROUNDINGS MONITORING APPARATUS

(71) Applicants: TOYOTA JIDOSHA KABUSHIKI KAISHA, Toyota (JP); Continental Automotive GmbH, Hanover (DE)

(72) Inventors: Koji Takeuchi, Toyota (JP); Takuya Kaminade, Okazaki (JP); Yoji Honma, Yokohama (JP)

(73) Assignees: TOYOTA JIDOSHA KABUSHIKI KAISHA, Toyota (JP); Continental Automotive GmbH, Hanover (DE)

( * ) Notice: Subject to any disclaimer, the term of this patent is extended or adjusted under 35 U.S.C. 154(b) by 209 days.

(21) Appl. No.: 16/134,462

(22) Filed: Sep. 18, 2018

(65) Prior Publication Data

US 2019/0086511 A1 Mar. 21, 2019

(30) Foreign Application Priority Data

Sep. 19, 2017 (JP) .............................. JP2017-178511

(51) Int. Cl.
*G01S 7/02* (2006.01)
*G01S 13/87* (2006.01)
*G01S 13/04* (2006.01)
*G01S 13/931* (2020.01)

(52) U.S. Cl.
CPC .............. *G01S 7/023* (2013.01); *G01S 13/04* (2013.01); *G01S 13/87* (2013.01); *G01S 13/931* (2013.01); *G01S 2013/9315* (2020.01); *G01S 2013/93271* (2020.01); *G01S 2013/93272* (2020.01)

(58) Field of Classification Search
CPC .......... G01S 7/023; G01S 13/87; G01S 13/04; G01S 13/931; G01S 2013/9315; G01S 2013/93271; G01S 2013/93272; B60W 30/08; B60W 50/08
USPC ......................................................... 342/27
See application file for complete search history.

(56) References Cited

U.S. PATENT DOCUMENTS 5,657,024 A * 8/1997 Shingyoji ............. G01S 13/931
342/175
2017/0067991 A1 * 3/2017 Liu ......................... G01S 13/42

FOREIGN PATENT DOCUMENTS

| JP | 07-248382 A | 9/1995 | |
|---|---|---|---|
| JP | 7-333328 A | 12/1995 | |
| JP | 2004-317360 A | 11/2004 | |
| WO | WO-9600910 A1 * | 1/1996 | ........... G01S 13/426 |

* cited by examiner

*Primary Examiner* — Frank J McGue
(74) *Attorney, Agent, or Firm* — Sughrue Mion, PLLC

(57) ABSTRACT

If a vehicle surroundings monitoring apparatus is equipped with four radars disposed at each of the four corners of the body of a vehicle in order to detect an object around the vehicle, the interfere of the radio waves of the radars likely to occur. As a result, the accuracy for detecting an object by the radars will deteriorate. Specifically, if two of detection areas are adjacent to each other of the radars overlaps with each other and the two of the radars transmits radio waves at the same time, the interfere of the radio waves will occur in the overlapping area. In view of this, the four radars are divided into two groups such that the detection areas of two radars within the group aren't adjacent to each other and transmission period of one of the groups and that of the other of the groups are repeated alternately.

10 Claims, 9 Drawing Sheets

→ Time

VEHICLE SURROUNDINGS MONITORING APPARATUS

BACKGROUND

Technical Field

The present disclosure relates to a vehicle surroundings monitoring apparatus which detects an object around a vehicle (own vehicle) by use of radars.

Description of the Related Art

A vehicle surroundings monitoring apparatus which detects an object around an own vehicle by use of a plurality of radars is known (see, for example, Japanese Patent Application Laid-Open (kokai) No. H07-248382). Each of the radars transmits a radio wave and receives a reflected wave generated by an object reflecting the transmitted wave, to thereby detect a relative position, a relative speed, and the like of the object with respect to the own vehicle. The vehicle surroundings monitoring apparatus is installed on a drive support system which performs drive assist controls so as to assist drive operation of a driver and provides information (the relative position, the relative speed, and the like) about an object detected by the radars to the drive support system. The drive support system performs a variety of drive assist controls on the basis of the information about the object.

As an example of the drive assist controls, a blind spot monitoring (BSM) control is known. The BSM control is a control for generating a warning to a driver of the own vehicle in a case where an object is present in a blind area in which the driver cannot see an object through side mirrors of the own vehicle in many cases. In a case where a drive support system performs the BSM control, the drive support system is equipped with a vehicle surroundings monitoring apparatus which includes radars disposed at the rear right corner part and the rear left corner part of the body of the own vehicle.

As another example of the drive assist controls, a forward collision warning control is known. The forward collision warning control is a control for generating a warning to the driver in a case where an other vehicle approaches the own vehicle in a manner that a predicted (extrapolated) travel route of the own vehicle extending forward from the own vehicle intersects crosswise with a predicted (extrapolated) travel route of that other vehicle. In a case where a drive support system performs the forward collision warning control, the drive support system is equipped with a vehicle surroundings monitoring apparatus which includes radars disposed at the front right corner part and the front left corner part of the vehicle body.

In view of the above, a drive support system, such as a drive support system which performs both the BSM control and the forward collision warning control, which need to detect both an object present in a forward region (specifically, both in a forward right region and in a forward left region) and an object present in a backward region (specifically, both in a backward right region and in a backward left region) is preferably equipped with four radars disposed at each of the four corners of the vehicle body.

In a case where a vehicle surroundings monitoring apparatus is equipped with the four radars disposed at each of the four corners and detects an object around the own vehicle, because a detection angle range of each of the four radars is relatively wide in the horizontal direction which is parallel to the ground surface, as shown in FIG. 9A and FIG. 9B, detection areas A (radio wave transmission areas) of two radars adjacent to each other among the four radars R overlap with each other. In the overlapping areas X where two detection areas A overlap with each other, the radio waves transmitted by the radars interfere with each other, and thus, the accuracy for detecting an object may degrade. It should be noted that it is effective to widen the detection angle ranges of each of the four radars in the horizontal direction in order to reduce blind area of those radars.

Incidentally, each of the radars transmits the radio wave periodically. The interference of the radio waves occurs in a case where frequencies of the radio waves transmitted from the two radars adjacent to each other are identical to each other and transmission periods of the radio waves overlap with each other. For example, if the transmission periods which are mutually exclusive to each other are assigned for each of the four radars, the occurrence of the interference of the radio waves can be prevented. However, in this case, the time duration for completing the transmission of the radio waves from all of the four radars becomes relatively long, thereby increasing the possibility that the time required for detecting an object also becomes relatively long. As a result, a considerable delay may occur in performing drive assist controls such as in predicting a probability of a collision.

SUMMARY

In view of the foregoing, the present invention is made in order to solve the problems described above. That is, one of objects of the present invention is, in a vehicle surroundings monitoring apparatus having at least four radars, each disposed at each of the four corners of a vehicle body, in order to detect an object present around the own vehicle, to prevent the occurrence of the interference of the radio waves transmitted by the radars while reducing the possibility of occurrence of the delay in monitoring (detecting) the object.

A vehicle surroundings monitoring apparatus (10) which achieves the above-described object comprises four radars (12) and a transmission timing control means (13).

The four radars includes a forward right radar (12FR), a forward left radar (12FL), a backward right radar (12RR), and a backward left radar (12RL), each of said radars detecting an object in a respective detection area around a vehicle through transmitting a radio wave and receiving a reflection wave generated as a result of reflection by said object of the transmitted radio wave, said forward right radar being disposed at the front right corner part of a body of a vehicle, said forward left radar being disposed at the front left corner part of said body, said backward right radar being disposed at the rear right corner part of said body, said backward left radar disposed at the rear left corner part of said body.

The transmission timing control means for controlling "first diagonal radars" including said forward right radar and said backward left radar to perform an operation of alternating, at a predetermined interval (the sum of the transmission time Ton and the delay time Tdelay) (steps S11 to S14 and steps S41 to S43 of FIG. 5), a first transmission period for which each of the first diagonal radars transmits said radio wave in a synchronized manner and a first transmission stop period for which each of the first diagonal radars does not transmit said radio wave, and for controlling "second diagonal radars" including said forward left radar and said backward right radar to perform an operation of alternating, at said predetermined interval (steps S21 to S23 and steps S31 to S34 of FIG. 5), a second transmission period for which each of the second diagonal radars transmits said radio wave in a synchronized manner and a second transmission stop period for which each of the second diagonal radars does not transmit said radio wave, in such a manner that said first transmission period and said second transmission period do not overlap each other.

The vehicle surroundings monitoring apparatus according to the present invention is equipped with the radars disposed at (fixed to) the front right corner part, the front left corner part, the rear right corner part, and the rear left corner part, of the own vehicle. These radars transmit the radio waves and receive the reflection waves of the transmitted radio waves in order to detect an object (i.e., an obstacle, or a 3-D object) which is present around the own vehicle on the basis of the reflection waves. In order to detect an object which is present around the own vehicle by use of the radars disposed at the four corners, the detection angle ranges of each of the four radars in the horizontal direction (plane) should be relatively wide. Accordingly, the detection areas (radio wave transmission areas) of two of the radars from among the four radars which are adjacent to each other overlap with each other. Thus, the interference between/of the radio waves likely to occur in the overlapping areas. In view of this, the vehicle surroundings monitoring apparatus according to the present invention comprises the transmission timing control means.

The transmission timing control means controls transmission timings of the first diagonal radars (namely, a pair of the forward right radar disposed at the front right corner part, and the backward left radar disposed at the rear left corner part) so as to perform the operation of alternating the transmission periods and the transmission stop periods synchronously (simultaneously) at the predetermined interval (cycle). In addition, the transmission timing control means controls transmission timings of the second diagonal radars (namely, a pair of the forward left radar disposed at the front left corner part, and the backward right radar disposed at the rear right corner part) so as to perform the operation of alternating the transmission periods and the transmission stop periods synchronously (simultaneously) at the predetermined interval (cycle) which are same in length as that for/of the first diagonal radars. Further, the transmission timing control means controls the transmission timings of the first diagonal radars and the second diagonal radars (the transmission timings of the four radars) such that the transmission periods of the first diagonal radars does not overlap with the transmission periods of the second diagonal radars. Namely, the transmission timing control means controls the transmission timings of the first diagonal radars and the second diagonal radars such that that the transmission periods of the first diagonal radars (namely, the first transmission period) and the transmission periods of the second diagonal radars (namely, the second transmission period) are different from each other (namely, no overlapping periods is present between the transmission periods of the first diagonal radars and the transmission periods of the second diagonal radars).

Therefore, the interference of/between the radio waves associated with the two radars adjacent to each other in the lateral direction (for example, the forward right radar and the forward left radar) or in the longitudinal direction (for example, the forward right radar and the backward right radar) is avoided, whereby the deterioration (degradation) of the accuracy for detecting an object by the radars is prevented. In addition, the four radars are divided into two groups (namely, the first diagonal radars and the second diagonal radars), and the transmission periods which are mutually exclusive to each other are assigned for each of the two groups. Namely, the first transmission period and the second transmission period do not overlap with each other. Therefore, the time duration for completing the transmission of the radio waves by all of the four radars becomes shorter compared with the case where the transmission periods which are mutually exclusive to each other are assigned for each of the four radars. Consequently, the case that the time duration for detecting an object around the own vehicle by the four radars (detecting duration) becomes excessively long is avoided.

For example, a drive support system which assists drive operation of the driver of the own vehicle on the basis of information about an object around the own vehicle detected by the vehicle surroundings monitoring apparatus according to the present invention can quickly obtain the information about the object with high detection accuracy. Therefore, such a drive support system can perform the drive assist control appropriately.

In one mode of the apparatus of the present invention,
said transmission timing control means is configure to:
set said first transmission period and said first transmission stop period to be equal in length to each other;
set said second transmission stop period in such a manner that said second transmission stop period overlap completely with said first transmission period; and
set said second transmission period in such a manner that said second transmission period overlaps completely with said first transmission stop period (FIG. 6).

In the aspect of the vehicle surroundings monitoring apparatus according to the present invention, the transmission timing control means controls the first diagonal radars such that the first diagonal radars continues transmitting the radio waves during the first transmission period and the first diagonal radars does not transmit the radio waves during the first transmission stop period which is as long (the same length in time) as the first transmission period. In addition, the transmission timing control means controls the second diagonal radars such that the second diagonal radars continues transmitting the radio waves during the second transmission period which overlaps completely with (or is synchronized with) the first transmission stop period, and the second diagonal radars does not transmit the radio waves during the second transmission stop period which overlaps completely with (or is synchronized with) the first transmission period.

Therefore, the first diagonal radars continue transmitting the radio waves during the period when the second diagonal radars do not transmit the radio waves, and the second diagonal radars continue transmitting the radio waves during the period when the first diagonal radars do not transmit the radio waves. Consequently, the detecting duration does not become excessively long.

In another aspect of the apparatus of the present invention,
said transmission timing control means comprises:
forward right transmission control means (13FR) for controlling radio wave transmission of said forward right radar;
forward left transmission control means (13FL) for controlling radio wave transmission of said forward left radar;
backward right transmission control means (13RR) for controlling radio wave transmission of said backward right radar; and
backward left transmission control means (13RL) for controlling radio wave transmission of said backward left radar, and wherein, one of said forward right transmission control means and said backward left transmission control means is configured to send a first synchronization signal (synchronization flag F1) to said forward left transmission control means and said backward right transmission control means at a timing associated with a start timing of radio wave transmission of the radar which said one of said forward right transmission control means and said backward left transmission control means (steps S11 to S12 of FIG. 5);

each of said forward left transmission control means and said backward right transmission control means is configured to determine a start timing of radio wave transmission of the radar which said each of said forward left transmission control means and said backward right transmission control means on the basis of a reception timing of said first synchronization signal (steps S21 to S22 and S31 to S32 of FIG. 5);

one of said forward left transmission control means and said backward right transmission control means is configured to send a second synchronization signal (synchronization flag F2) to said forward right transmission control means and said backward left transmission control means at a timing associated with a start timing of radio wave transmission of the radar which said one of said forward left transmission control means and said backward right transmission control means (steps S33 to S34 of FIG. 5); and each of said forward right transmission control means and said backward left transmission control means is configured to determine a the start timing of radio wave transmission of the radar which said each of said forward right transmission control means and said backward left transmission control means on the basis of a reception timing of said second synchronization signal (steps S13 to S14 and S41 to S42 of FIG. 5).

In the aspect of the vehicle surroundings monitoring apparatus according to the present invention, the transmission timing control means comprises the forward right transmission control means, the forward left transmission control means, the backward right transmission control means, and the backward left transmission control means. The forward right transmission control means controls transmission of the radio wave from the forward right radar. The forward left transmission control means controls transmission of the radio wave from the forward left radar. The backward right transmission control means controls transmission of the radio wave from the backward right radar. The backward left transmission control means controls transmission of the radio wave from the backward left radar.

One of the forward right transmission control means and the backward left transmission control means sends the first synchronization signal to the forward left transmission control means and the backward right transmission control means at the timing associated with the start timing of the first transmission period.

Each of the forward left transmission control means and the backward right transmission control means determines the start timing of the second transmission period on the basis of the reception timing of the first synchronization signal.

One of the forward left transmission control means and the backward right transmission control means sends the second synchronization signal to the forward right transmission control means and the backward left transmission control means at the timing associated with the start timing of the second transmission period.

Each of the forward right transmission control means and the backward left transmission control means determines the start timing of the first transmission period on the basis of the reception timing of the second synchronization signal.

According to the present aspect, in the manner described above, it is possible to have the four radars cooperate with each other by use of the first synchronization signal and the second synchronization signal so as to control the transmission timings of the radio waves from the four radars by simple processes.

Notably, in the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE EMBODIMENTS

A vehicle surroundings monitoring apparatus according to an embodiment of the present invention will be described with reference to the drawings.

Figure 1:
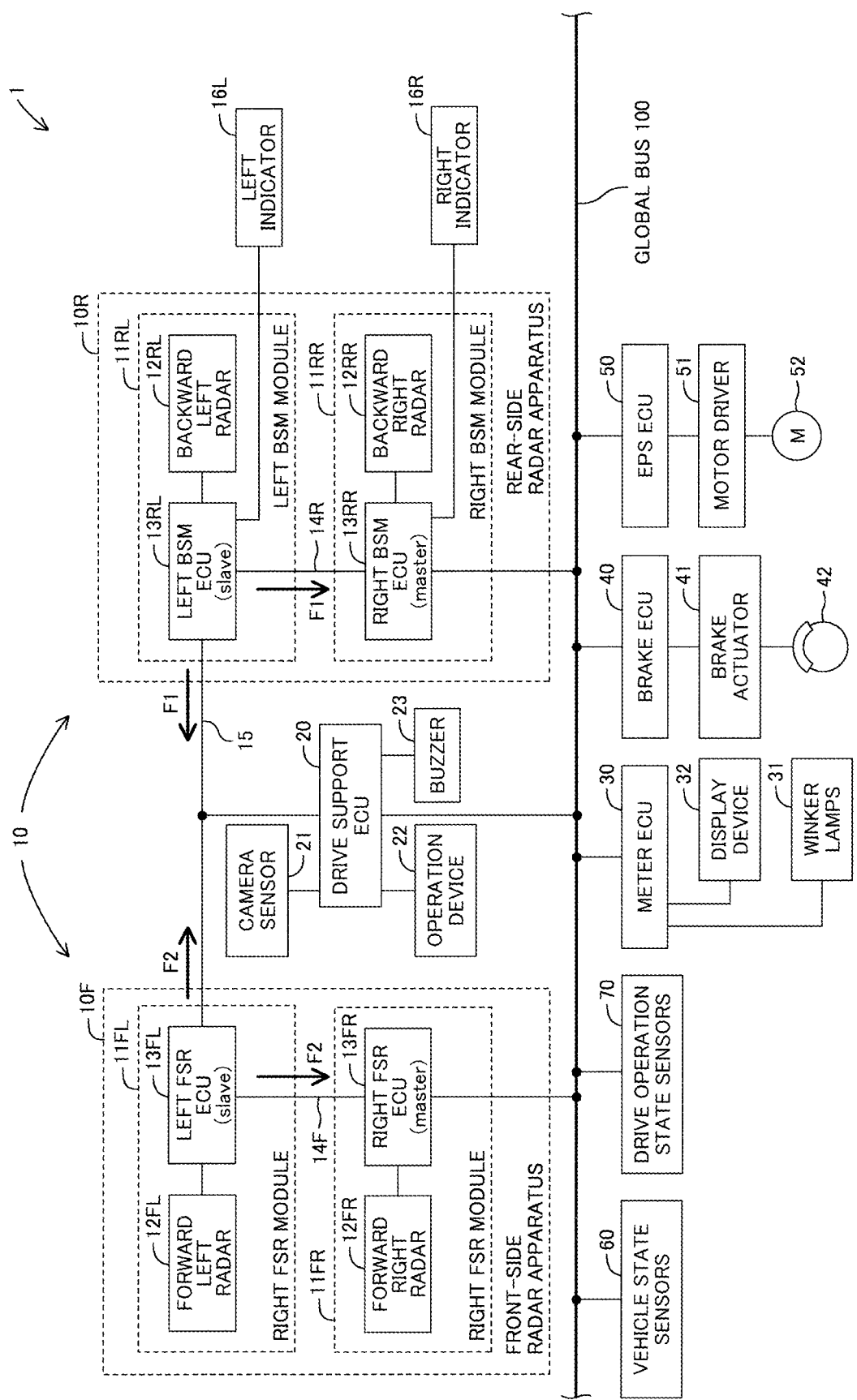
FIG. 1 is a schematic system diagram of a drive support system equipped with a vehicle surroundings monitoring apparatus according to an embodiment of the present invention.

FIG. 1 shows a schematic diagram of a drive support system 1 equipped with a vehicle surroundings monitoring apparatus 10 according to the present embodiment of the present invention. The drive support system 1 is installed (mounted) on a vehicle (hereinafter also referred to as an "own vehicle" in order to distinguish the own vehicle from other vehicles).

The drive support system 1 is equipped with a drive support ECU 20, a meter ECU 30, a brake ECU 40, and an electric power steering ECU 50 as well as the vehicle surroundings monitoring apparatus 10.

Each of the ECUs is an Electric Control Unit which is equipped with a microcomputer as a main component. These ECUs are connected to each other via a global bus 100 which is a communication line (data bus) of a Controller Area Network (CAN) so as to send information to the other ECUs and receive information from the other ECUs. In the present embodiment, each of the microcomputers includes a CPU, a ROM, a RAM, a non-volatile memory, interfaces (I/F), and the like. The CPU is configured to implement various functions by executing instructions (programs, routines) stored in the ROM. Some or all of those ECUs may be integrated into a (one) single ECU.

In addition, vehicle state sensors 60 and drive operation state sensors 70 are connected to the global bus 100. The vehicle state sensors 60 include a plurality of sensors which detect states of the own vehicle. The drive operation state sensors 70 include a plurality of sensors which detect drive operation states of a driver of the own vehicle. Both of the vehicle state sensors 60 and the drive operation state sensors 70 are components of the drive support system 1. For example, the vehicle state sensors 60 include a vehicle speed sensor for detecting the vehicle speed of the own vehicle, wheel speed sensors for detecting the rotational speeds of the wheels of the own vehicle, a longitudinal acceleration sensor for detecting an acceleration of the own vehicle in the longitudinal direction, a lateral acceleration sensor for detecting an acceleration of the own vehicle in the lateral direction, a yaw rate sensor for detecting a yaw rate of the own vehicle, etc.

The drive operation state sensors 70 include an accelerator operation amount sensor for detecting an operation amount of an accelerator pedal of the own vehicle, a brake operation amount sensor for detecting an operation amount of a brake pedal of the own vehicle, a brake switch for detecting the presence of an operation of the brake pedal, a steering angle sensor for detecting a steering angle of a steering wheel of the own vehicle, a steering torque sensor for detecting a steering torque of the steering wheel steered by the driver, a winker lever operation sensor for detecting a presence of an operation of a winker lever of the own vehicle, a shift position sensor for detecting a shift (operation) position of a shift lever of the own vehicle, etc.

Information detected (acquired) by the vehicle state sensors 60 and the drive operation state sensors 70 (hereinafter also referred to as "sensor information" for simplification) is sent to the global bus 100 so as to be received and be utilized by the ECUs as needed. Notably, some of the sensors included by the vehicle state sensors 60 and the drive operation state sensors 70 may be connected to a certain ECU and, in this case, information detected by the sensors is sent to the global bus 100 by that ECU as sensor information.

The vehicle surroundings monitoring apparatus 10 included in the drive support system 1 is an apparatus which detects a tridimensional object (a three-dimensional object) which is present around the own vehicle and which sends information associated with the detected object to the drive support ECU 20.

The vehicle surroundings monitoring apparatus 10 is equipped with a front-side radar apparatus 10F and a rear-side radar apparatus 10R. The front-side radar apparatus 10F detects a tridimensional object which is present in the forward right area and the forward left area of the own vehicle. The rear-side radar apparatus 10R detects a tridimensional object which is present in the backward right area and the backward left area of the own vehicle. The front-side radar apparatus 10F includes a forward right radar module 11FR and a forward left radar module 11FL. The forward right radar module 11FR may also be referred to as the right FSR module 11FR. The forward left radar module 11FL may also be referred to as the left FSR module 11FL. Notably, "FSR" stands for "Front Side Radar."

The rear-side radar apparatus 10R includes a backward right radar module 11RR and a backward left radar module 11RL. The backward right radar module 11RR may also be referred to as the right BSM module 11RR. The backward left radar module 11RL may also be referred to as the left BSM module 11RL. Notably, "BSM" stands for "Blind Spot Monitoring."

Figure 2:
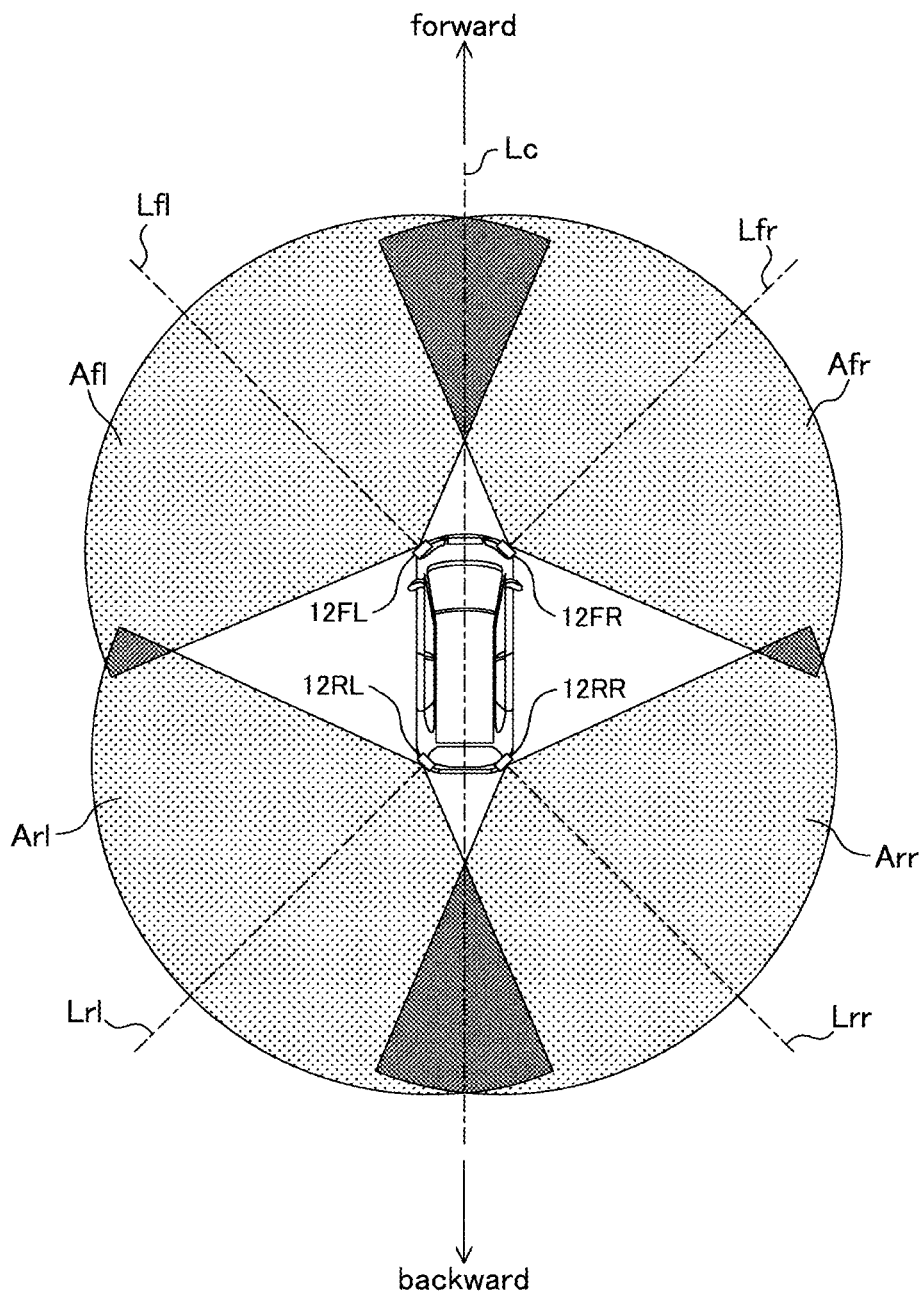
FIG. 2 is a top view diagram showing installation positions and detection angle ranges of four radars.

The right FSR module 11FR includes a forward right radar 12FR, and a right FSR ECU 13FR which is connected to the forward right radar 12FR. The forward left radar module 11FL includes a forward left radar 12FL, and a left FSR ECU 13FL which is connected to the forward left radar 12FL. As shown in FIG. 2, the forward right radar 12FR is fixed to the front right corner part of a body (for example, a front bumper) of the own vehicle. Meanwhile, the forward left radar 12FL is fixed to the front left corner part of the vehicle body (for example, the front bumper). Notably, in the present embodiment, the right FSR ECU 13FR and the left FSR ECU 13FL are provided with the forward right radar 12FR and the forward left radar 12FL, respectively, in an integrated manner, but it is not essential. Namely, the right FSR ECU 13FR may be provided separately from the forward right radar 12FR and the left FSR ECU 13FL may be provided separately from the forward left radar 12FL.

In the present embodiment, the forward right radar 12FR transmits a radio wave which propagates within a detection area Afr shown in FIG. 2. The detection area Afr expands between a direction which is approximately at 75 degrees rightward to a reference line Lfr and a direction which is approximately at 75 degrees leftward to the reference line Lfr. The reference line Lfr is a straight line extending in the diagonally frontward right direction from the front right corner part of the vehicle body. The forward right radar 12FR receives a reflected wave which is a reflected wave generated by a tridimensional object so as to detect the tridimensional object on the basis of the received reflected wave. Namely, the forward right radar 12FR detects the tridimensional object which is present in the detection area Afr. Similarly, the forward left radar 12FL transmits a radio wave which propagates within a detection area Afl shown in FIG. 2. The detection area Afl expands between a direction which is approximately at 75 degrees rightward to a reference line Lfl and a direction which is approximately at 75 degrees leftward to the reference line Lfl. The reference line Lfl is a straight line extending in the diagonally frontward left direction from the front left corner part of the vehicle body. The forward left radar 12FL receives a reflected wave which is a reflected wave generated by a tridimensional object so as to detect the tridimensional object on the basis of the received reflected wave. Namely, the forward left radar 12FL detects the tridimensional object which is present in the detection area Afl. The detection area Afr and the detection area Afl are symmetrically arranged about an axis line Lc which extends in the longitudinal direction of the own vehicle and which is passes through the center of the own vehicle. The detection area Afr and the detection area Afl partially overlap with each other in a region in the center front of the own vehicle. This overlapping area is shown in FIG. 2 as dark gray (dark pattern) area.

Referring back to FIG. 1, the right BSM module 11RR includes a backward right radar 12RR, and a right BSM ECU 13RR which is connected to the backward right radar 12RR. The backward left radar module 11RL includes a backward left radar 12RL, and a left BSM ECU 13RL which is connected to the backward left radar 12RL. As shown in FIG. 2, the backward right radar 12RR is fixed to the rear right corner part of the vehicle body (for example, a rear bumper). The backward left radar 12RL is fixed to the rear left corner part of the vehicle body (for example, the rear bumper). Notably, in the present embodiment, the right BSM ECU 13RR and the left BSM ECU 13RL are provided with the backward right radar 12RR and the backward left radar 12RL, respectively, in an integrated manner, but it is not essential. Namely, the right BSM ECU 13RR may be provided separately from the backward right radar 12RR and the left BSM ECU 13RL may be provided separately from the backward left radar 12RL.

In the present embodiment, the backward right radar 12RR transmits the radio wave, which propagates within a detection area Arr shown in FIG. 2. The detection area Arr expand between a direction which is approximately at 75 degrees rightward to a reference line Lrr and a direction which is approximately at 75 degrees leftward to the reference line Lrr. The reference line Lrr is a straight line extending in the diagonally backward right direction from the rear right corner part of the vehicle body. The backward right radar 12RR receives a reflected wave which is a reflected wave generated by a tridimensional object so as to detect the tridimensional object on the basis of the received reflected wave. Namely, the backward right radar 12RR detects the tridimensional object which is present in the detection area Arr. Similarly, the backward left radar 12RL transmits a radio wave, which propagates within a detection area Arl shown in FIG. 2. The detection area Arl expands between a direction which is approximately at 75 degrees rightward to a reference line Lrl and a direction which is approximately at 75 degrees leftward to the reference line Lrl. The reference line Lrl is a straight line extending in the diagonally backward left direction from the rear left corner part of the vehicle body. The backward left radar 12RL receives a reflected wave which is a reflected wave generated by a tridimensional object so as to detect the tridimensional object on the basis of the received reflected wave. Namely, the backward left radar 12RL detects the tridimensional object which is present in the detection area Arl. The detection area Arr and the detection area Arl are symmetrically arranged about the axis line Lc. The detection area Arr and the detection area Arl partially overlap with each other in a region in the center rear of the own vehicle. This overlapping area is also shown in FIG. 2 as a dark gray area.

Further, The detection area Afr of the forward right radar 12FR and the detection area Arr of the backward right radar 12RR partially overlap with each other in a region in the right-center of the own vehicle. Similarly, The detection area Afl of the forward left radar 12FL and the detection area Arl of the backward left radar 12RL partially overlap with each other in a region in the left-center of the own vehicle. These overlapping areas are also shown in FIG. 2 as dark gray areas.

It should be noted that the detection area Afr, the detection area Afl, the detection area Arr, and the detection area Arl shown in FIG. 2 represent detection angular ranges of the forward right radar 12FR, the forward left radar 12FL, the backward right radar 12RR, and the backward left radar 12RL, respectively. Namely, these areas shown in FIG. 2 do not represent detection distances of these radars. The detection distances are suitably designed in associated with the own vehicle, and in one instance, each of these radars may be designed in order to detect a tridimensional object which is present within a detection distance of several dozen meters.

Hereinafter, the forward right radar 12FR, the forward left radar 12FL, the backward right radar 12RR, and the backward left radar 12RL will be also collectively referred to as the radars 12 when they do not need to be distinguished from each other. The right FSR ECU 13FR, the left FSR ECU 13FL, the right BSM ECU 13RR, and the left BSM ECU 13RL will be also collectively referred to as the radar ECUs 13 when they do not need to be distinguished from each other.

In the present embodiment, each of the radars 12 adopts a Frequency Modulated Continuous Wave (FM-CW) method so as to detect a distance between the radar and a tridimensional object, a relative speed of the tridimensional object to the radar, and the like. This type of vehicle-mounted radar is well known (for example, refer to Japanese Patent Application Laid-Open (kokai) No. 2010-8365). Therefore, a brief description will be provided below.

Each of the radars 12 is equipped with a transmission section, a reception section (receiving section), and a processing section (none of these sections are shown in the drawings). The transmission section generates a "transmission signal" obtained by modulating a reference signal of pre-configured frequency, and transmits the transmission signal (as the radio wave) toward the detection area from a transmission antenna equipped with the transmission section. A "point in time at which transmitting the transmission signal from a certain radar among the radars 12 is started" and a "point in time at which transmitting the transmission signal from the certain radar is stopped" are controlled by an certain ECU from among the radar ECUs 13, the certain ECU connected to the certain radar. A time period when the transmission signal continues being transmitted will be referred as a "transmission period." Meanwhile, a time period when the transmission signal is not transmitted will be referred as a "transmission stop period." The transmission period and the transmission stop period are alternately switched at/with a predetermined interval (cycle). Accordingly, the transmission signals are transmitted repeatedly by the transmission section at/with the predetermined interval (cycle).

Each of the radars 12 has common specifications. Therefore, frequencies of the transmission signals transmitted from the radars 12 are identical to each other. The frequency of the transmission signal falls within the range of a millimeter waveband or a quasi-millimeter wave band. The transmission signal which is transmitted from the transmission antenna of the transmission section is also referred to as the "radio wave" as described above.

The reception section includes a reception antenna and an electronic circuit which processes a signal received through the reception antenna as a "reception signal." Therefore, when a tridimensional object is present in the detection area described above, a reflected wave which is generated by the tridimensional object reflecting the radio wave radiated to that tridimensional object is received by the reception section as the reception signal.

During the transmission period, the processing section sequentially obtains information about the transmission signal generated by the transmission section and the reception signal received by the reception section, and stores the information about the transmission signal and the reception signal in its memory (not shown). During the transmission stop period, the processing section generates a beat signal by means of mixing the transmission signal with the reception signal and performs a frequency analysis on the beat signal by use of a method such as fast Fourier transform (FFT). The processing section detects (acquires) a distance from each of the radars 12 to the tridimensional object and a relative speed of the tridimensional object with respect to each of the radars 12 by use of the frequency analysis, or the like. In addition, the processing section also obtains (acquires) a direction and a size (width) of the tridimensional object to each of the radars 12. Accordingly, the processing section obtains (acquires) a relative position (the relative distance and the relative direction), the relative speed, the size, or the like of the tridimensional object. Hereinafter, information about a tridimensional object obtained (acquired) by the processing section will also be referred as "tridimensional object information."

It should be noted that a variety of known detection methods may be adopted by the radars 12. For example, the radars 12 may adopt a pulse compression FM-CW method, which is one of the FM-CW methods. Alternatively, the radars 12 may adopt a "method other than the FM-CW methods" which causes the interference of radio wave which will be discussed later in the present embodiments of the present invention.

The forward right radar 12FR sends (transmits) the tridimensional object information to the right FSR ECU 13FR. Similarly, the forward left radar 12FL sends (transmits) the tridimensional object information to the left FSR ECU 13FL. The backward right radar 12RR sends (transmits) the tridimensional object information to the right BSM ECU 13RR. The backward left radar 12RL sends (transmits) the tridimensional object information to the left BSM ECU 13RL.

On the basis of the tridimensional object information transmitted from the radars 12, each of the radar ECUs 13 generates (obtains) information required for a "drive assist control" described below in detail. For example, the radar ECUs 13 obtain information about a position of a tridimensional object represented in a two dimensional coordinate system whose original point is adjusted to a predetermined arbitrary position on the own vehicle so as to be able to specify the position of the tridimensional object relative to the own vehicle. In addition, the radar ECUs 13 extract (select) one or more of the tridimensional objects required for the drive assist control from among tridimensional objects detected by the radars 12, and sends (transmits) information about the extracted tridimensional objects to the drive support ECU 20. Hereinafter, information about the tridimensional object required for the drive assist control (information about the tridimensional object sent to the ECU 20) will also be referred to as "target information." The target information includes a relative position (which is represented by a relative distance and a relative direction), a relative speed, a size, and the like of a tridimensional object with respect to the own vehicle.

The right FSR ECU 13FR and the left FSR ECU 13FL are connected to each other via a local bus 14F in a master and slave mode. In the present embodiment, the right FSR ECU 13FR operates (functions) as the master and the left FSR ECU 13FL operates (functions) as the slave. The right FSR ECU 13FR, which is the master, is connected to the global bus 100.

The right BSM ECU 13RR and the left BSM ECU 13RL are connected to each other via a local bus 14R in a master and slave mode. In the present embodiment, the right BSM ECU 13RR operates (functions) as the master and the left BSM ECU 13RL operates (functions) as the slave. The right BSM ECU 13RR, which is the master, is connected to the global bus 100.

In addition, the left FSR ECU 13FL (slave) and the left BSM ECU 13RL (slave) are connected to each other via local bus 15. The drive support ECU 20 is also connected to the local bus 15.

As for the drive support system 1, the right FSR ECU 13FR sends target information generated by itself to the left FSR ECU 13FL. The left FSR ECU 13FL sends both target information generated by itself and the target information sent from the right FSR ECU 13FR to the drive support ECU 20 via the local bus 15.

The right BSM ECU 13RR sends target information generated by itself to the left BSM ECU 13RL. The left BSM ECU 13RL sends both target information generated by itself and the target information sent from the right BSM ECU 13RR to the drive support ECU 20 via the local bus 15.

As for the drive support system 1, the drive support ECU 20 is a core control unit. The drive support ECU 20 performs a "forward collision warning control," a "backward collision warning control," and a "lane change assist control," as the drive assist control on the basis of the target information transmitted (provided) from the vehicle surroundings monitoring apparatus 10.

The forward collision warning control is a control for generating (issuing) a warning to the driver in a case where an object (moving object, i.e., an other vehicle which is a vehicle other than the own vehicle) approaches the own vehicle in a manner that a predicted (extrapolated) travel route of the own vehicle extending forward from the own vehicle intersects crosswise with a predicted travel route of that other vehicle, in order to notify (alert) the driver of the presence of that other vehicle and prompt (urge) the driver to make an operation for avoiding a collision with that other vehicle. The backward collision warning control is a control is a control for generating (issuing) a warning to the driver in a case where an other vehicle approaches the own vehicle in a manner that a predicted (extrapolated) travel route of the own vehicle extending backward from the own vehicle intersects crosswise with a predicted travel route of that other vehicle, in order to notify (alert) the driver of the presence of that other vehicle and prompt (urge) the driver to make an operation for avoiding a collision with that other vehicle.

The lane change assist control is a control for controlling the steering angle of the own vehicle automatically so as to assist drive operation of the driver in changing lanes from an "original lane" which is a lane in which the own vehicle is traveling to a "target lane" which is a lane adjacent to the original lane. The lane change assist control is performed when a lane change assist request is accepted.

The forward collision warning control, the backward collision warning control, and the lane change assist control will be described later in greater detail.

A camera sensor 21, an operation device 22, and a buzzer 23 are connected to the drive support ECU 20.

The camera sensor 21 is equipped with a camera and an image processing section, which are not shown. The camera takes (captures) an image of a region in front of the own vehicle to obtain data representing the image (image data). The image processing section obtains (recognizes) a pair of lane separation lines (lane markers, i.e., a right separation line and a left separation line) formed (or painted) on a road on the basis of the image data obtained by the camera. The right and left separation lines define the original lane. In addition, the image processing section figures out (obtains)

a lateral position and a direction of the own vehicle relative to (with respect to) the "original lane where the own vehicle is present" defined by the pair of lane separation lines. Further, the image processing section figures out a width and a curvature of the original lane. The camera sensor 21 provides (sends) the information figured out by the image processing section to the drive support ECU 20 as "lane information."

The operation device 22 is a device (instrument) to be operated by the driver so as to arrange configurations (settings) about request states and parameters of each of the drive assist controls. The operation device 22 may be composed of a plurality of devices instead of a single device.

The buzzer 23 operates so as to generate a warning sound when it receives a warning request from the drive support ECU 20. When the buzzer 23 generates the warning sound, the driver will become aware of the need for caution (the driver is alerted).

Winker lamps 31 which comprise right turn signal lamps and left turn signal lamps, and a display device 32 are connected to the meter ECU 30. The winker lamps 31 are also referred to as turn signal lamps. In addition, the winker lamps 31 can function as a hazard indicator (hazard lights) when both of the right turn signal lamps and the left turn signal lamps blink simultaneously. Hereinafter, the winker lamps 31 will be referred to as the hazard lamps 31 when used as the hazard indicator.

The meter ECU 30 is equipped with a winker drive circuit (an electronic circuit), which is not shown, so as to control the winker lamps 31. When the meter ECU 30 receives a winker blink request which includes a turning direction (namely, right or left) via the global bus 100, the meter ECU 30 makes "lamps among the winker lamps 31" corresponding to the turning direction" blink intermittently. Meanwhile, when the meter ECU 30 receives a hazard lamp blink request via the global bus 100, the meter ECU 30 intermittently makes "all of the winker lamps 31 (namely, both right and left lamps as the hazard lamps 31)" blink simultaneously.

In addition, when the winker lever is tilted clockwise or counterclockwise from its neutral position by the driver, the meter ECU 30 receives, from the winker lever operation sensor, a detection signal including a turning direction (namely, right or left) indicated (designated) by the driver's operation on the winker lever. When the meter ECU 30 receives the detection signal, the meter ECU 30 makes "lamps among the winker lamps 31" corresponding to the turning direction included in the detection signal" intermittently blink. In this case, when the meter ECU 30 makes the lamps of the winker lamps 31 intermittently blink, the meter ECU 30 sends a winker monitor signal which is indicative of a blinking state of the winker lamps 31 to the global bus 100.

Further, when the meter ECU 30 receives an indication request via the global bus 100, the meter ECU 30 displays contents specified by the indication request on the display device 32. For example, when the drive support ECU 20 detects a target object to which the driver should be alerted through the forward collision warning control and/or the backward collision warning control, the drive support ECU 20 makes the buzzer 23 generate the warning sound and sends the indication request for warning to the meter ECU 30. In this case, the meter ECU 30 displays, on the display device 32, contents to notify the driver of information represented by the indication request for warning (for example, the direction of the target object relative to the own vehicle, i.e., right or left).

In addition, for example, during the performance of the lane change assist control, the drive support ECU 20 sends the indication request for lane change assist which represents a performing status of the lane change assist control, and the winker blink request, to the meter ECU 30 in proper timings. In this case, the meter ECU 30 displays, on the display device 32, contents to notify the driver of the performing status of the lane change assist control on the basis of the indication request for lane change assist. Meanwhile, the meter ECU 30 makes lamps corresponding to the direction of the target lane intermittently blink among the winker lamps 31 on the basis of the winker blink request.

A brake actuator 41 is connected to the brake ECU 40. The brake actuator 41 is provided in a hydraulic circuit extending between a master cylinder (not shown) and a frictional brake mechanism 42. The master cylinder pressurizes hydraulic oil by using the depressing force applied to the brake pedal. The frictional brake mechanism 42 is disposed on four wheels (in the right and left and at the front and rear of the own vehicle). The frictional brake mechanism 42 is equipped with brake disks each of which is fixed on the wheel, and brake calipers each of which is fixed on the vehicle body. Each of the brake calipers is equipped with a pair of brake pads. According to a request from the brake ECU 40, the brake actuator 41 controls the oil pressure supplied to wheel cylinders each of which is built in the brake caliper so as to operate the wheel cylinders such that the brake pads is pushed against the brake disks. As the result, frictional brake force applied to the wheels is generated. Namely, the brake ECU 40 controls frictional brake force of the own vehicle by means of controlling the brake actuator 41.

For example, when the brake ECU 40 receives a brake boost request via the global bus 100, the brake ECU 40 increases the frictional brake force compared to a case when the brake ECU 40 receives no brake boost request by means of controlling the brake actuator 41. Namely, when the brake ECU 40 receives the brake boost request, the brake ECU 40 makes the ratio of the magnitude of the frictional brake force to the operation amount of the brake pedal higher than in the case when the brake ECU 40 receives no brake boost request. In addition, for example, when the brake ECU 40 receives an automatic brake request via the global bus 100, the brake ECU 40 makes the frictional brake force generated as much as a predetermined magnitude by means of controlling the brake actuator 41 even when the brake pedal is not operated.

The electric power steering ECU 50 is a control unit for an electric power steering apparatus. Hereinafter, the electric power steering ECU 50 will also be referred to as the EPS ECU 50. A motor driver 51 is connected to the EPS ECU 50. The motor driver 51 is also connected to a steering motor 52. The steering motor 52 is embedded in a steering mechanism which is not shown.

The EPS ECU 50 detects the steering torque of the steering wheel steered by the driver by using the steering torque sensor which is disposed at a steering shaft. According to the detected steering torque, the EPS ECU 50 drives the steering motor 52 by means of controlling power supply of the motor driver 51. As the result of the drive of the steering motor 52, steering torque is given to the steering mechanism, whereby the steering operation by the driver is assisted.

In addition, when the EPS ECU 50 receives a steering request from the drive support ECU 20 via the global bus 100, the EPS ECU 50 makes the steering torque generated by driving of the steering motor 52 according to the amount of control specified by the steering request. The steering torque given to the steering mechanism in this case is not a steering assist torque generated in order to assist a steering operation by the driver as described above, but a torque which is caused by the steering request from the drive support ECU 20 and which is not attributable to a steering operation by the driver.

Figure 3:
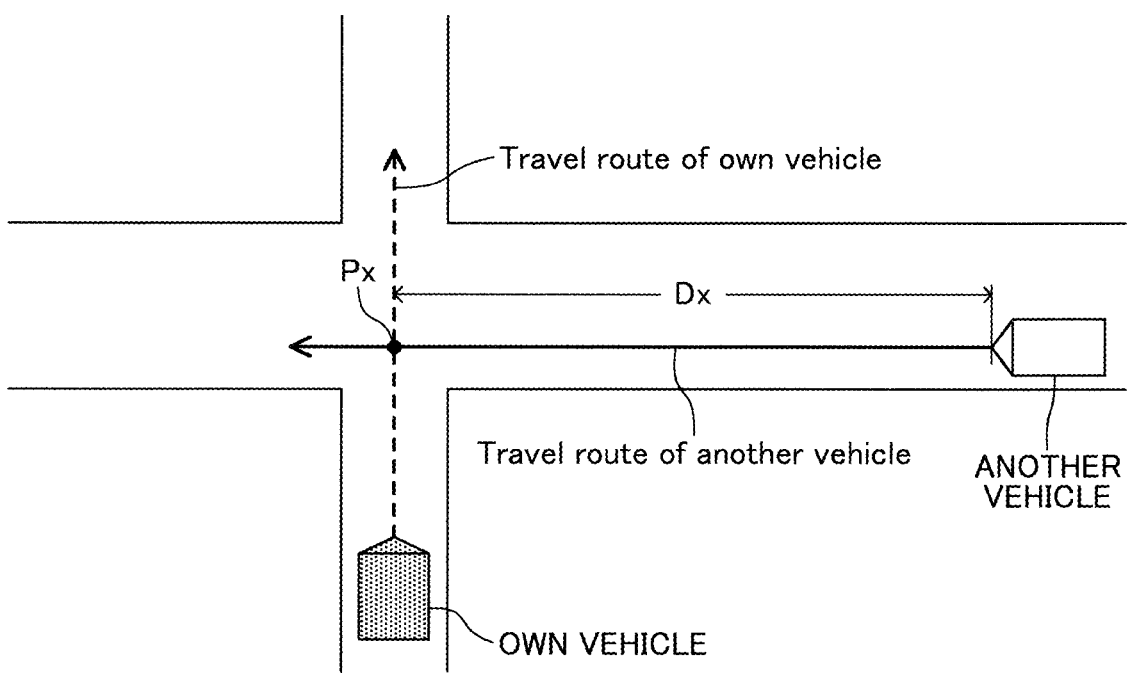
FIG. 3 is a top view diagram showing a relative position relationship between an own vehicle and another vehicle relevant to a forward collision warning control.

Next, the drive assist control performed by the drive support ECU 20 will be described. First, the forward collision warning control, which is a part of the drive assist control, will be described. As shown in FIG. 3, in a case where a predicted travel route of the own vehicle extending forward from the own vehicle intersects crosswise with a predicted travel route of an other vehicle (a vehicle other than the own vehicle) and that other vehicle approaches the predicted travel route of the own vehicle, the drive support ECU 20 generates (issues) the warning to the driver when a probability that the own vehicle collides with that other vehicle becomes high. In the present embodiment, a control to boost a brake force which is generated in accordance with an operation of the brake pedal by the driver is included in the forward collision warning control.

Hereinafter, an object which satisfies all of the following conditions (a) to (c) will be also referred to as a "crossing object."
(a) The object is present around (in the vicinity of) the own vehicle.
(b) A predicted travel route of the own vehicle intersects crosswise with a predicted travel route of the object at a position ahead of the own vehicle.
(c) The object approaches the predicted travel route of the own vehicle.

The drive support ECU 20 determines whether or not the crossing object is present repeatedly on the basis of the target information sent from the vehicle surroundings monitoring apparatus 10 and the "own vehicle state information" such as the vehicle speed, the accelerations, the yaw rate, the steering angle, detected by the vehicle state sensors 60 and the drive operation state sensors 70. When the drive support ECU 20 determines that the crossing object is present, the drive support ECU 20 figures out (obtains) an intersection point (position) at which the predicted travel route of the own vehicle and the predicted travel route of the crossing object intersect with each other, as a predicted crossing point PX. Thereafter, the drive support ECU 20 figures out (obtains) an object velocity Vx and a margin distance Dx, on the basis of a relative position relationship between the own vehicle and the crossing object, and the own vehicle state information. The object velocity Vx is a traveling velocity (speed) of the crossing object at the present point in time. The margin distance Dx is a distance between a position of the crossing object at the present point in time and the predicted crossing point PX.

The drive support ECU 20 figures out a margin time Tx which is a time from the present point in time to a point in time at which the crossing object reaches the predicted crossing point PX. The margin time Tx is figured out under the assumption that the velocity of the crossing object remains unchanged from the present point in time. Specifically, the margin time Tx is figured out by dividing the margin distance Dx by the object velocity Vx (namely, Tx=Dx/Vx).

The drive support ECU 20 determines whether or not the margin time Tx is equal to or shorter than a predetermined time threshold Tref. The time threshold Tref sets (determines) the timing to generate (issue) a warning to the driver and is set to a time which is long enough for the driver to make an operation to avoid the collision with the crossing object (collision avoidance operation) after the warning. When the margin time Tx is longer than the time threshold Tref, the drive support ECU 20 repeats this determining processes described above periodically. Accordingly, the drive support ECU 20 repeatedly determines whether or not the crossing object is present, and every time it is determined that the crossing object is present, the drive support ECU 20 figures out the margin time Tx for that crossing object and determines whether or not the margin time Tx is equal to or shorter than the time threshold Tref repeatedly.

While the drive support ECU 20 repeats those described processes, the drive support ECU 20 makes the buzzer 23 generate the warning sound and sends the indication request for warning to the meter ECU 30, when it is determined (detected) that the margin time Tx has become equal to or shorter than the time threshold Tref. When the meter ECU 30 receives the indication request, it displays, on the display device 32, the contents to notify the driver of information represented by the indication request for warning (for example, contents being the direction of the crossing object relative to the own vehicle, i.e. right or left). This warning enables the driver to recognize that the crossing object is approaching and to make the collision avoidance operation as needed.

In addition, the drive support ECU 20 sends the brake boost request to the brake ECU 40 at the same time as sending the indication request for warning to the meter ECU 30. Accordingly, when the driver operates (press down) the brake pedal, a frictional brake force greater than a usual frictional brake force in accordance with the brake pedal operation is generated so as to assist the brake pedal operation of the driver.

While an ignition switch (not shown) of the own vehicle is in an ON state, the forward collision warning control is performed repeatedly. Thus far, the forward collision warning control has been described.

As described above, the crossing object targeted by the forward collision warning control is an object with which the own vehicle will collide when the own vehicle travels forward. In contrast, a crossing object targeted by the backward collision warning control is an object with which the own vehicle will collide when the own vehicle travels backward. Namely, the backward collision warning control is different from the forward collision warning control only in how to specify a crossing object as a target of the control. Therefore, descriptions of the backward collision warning control are omitted.

Next, the lane change assist control will be described. As mentioned above, the lane change assist control is a control for automatically controlling the steering (angle) of the own vehicle in such a manner that the traveling position of the own vehicle changes from the original lane to the target lane so as to assist drive operation of the driver for changing lanes. Therefore, according to the lane change assist control, a lane change can be performed without steering operation (steering wheel operation) of the driver.

The lane change assist control is a control relevant to the lateral position of the own vehicle with respect to a lane in which the own vehicle is traveling, and is performed when the lane change assist request is accepted. The lane change assist request is generated through a predetermined operation by the driver such as a predetermined operation of the winker lever. Alternatively, a dedicated operation device for generating the lane change assist request other than the winker lever may be provided the own vehicle. When the drive support ECU 20 receives the lane change assist request, the drive support ECU 20 determines whether or not a "lane change assist start permission condition" described below is satisfied. If the lane change assist start permission condition is satisfied, the drive support ECU 20 starts the lane change assist control. Notably, the lane change assist request includes information to specify a direction of the lane change (namely, right or left).

The lane change assist start permission condition contains at least the following two conditions (1) and (2).
(1) A lane marker (e.g., a white line) which is a boundary line between the original lane and the target lane is a broken line.
(2) No obstacles to the lane change are detected, and thus, it is determined that the lane change can be safely performed.

If the lane change assist start permission condition which contains both of the conditions (1) and (2) is satisfied, the drive support ECU 20 accepts the lane change assist request and starts the lane change assist control.

The condition (1) is a condition to observe a traffic regulation that a lane change is allowed in a case where the lane marker which is the boundary line is a broken line. The drive support ECU 20 determines whether or not the condition (1) is satisfied on the basis of the lane information provided from the camera sensor 21.

Figure 4:
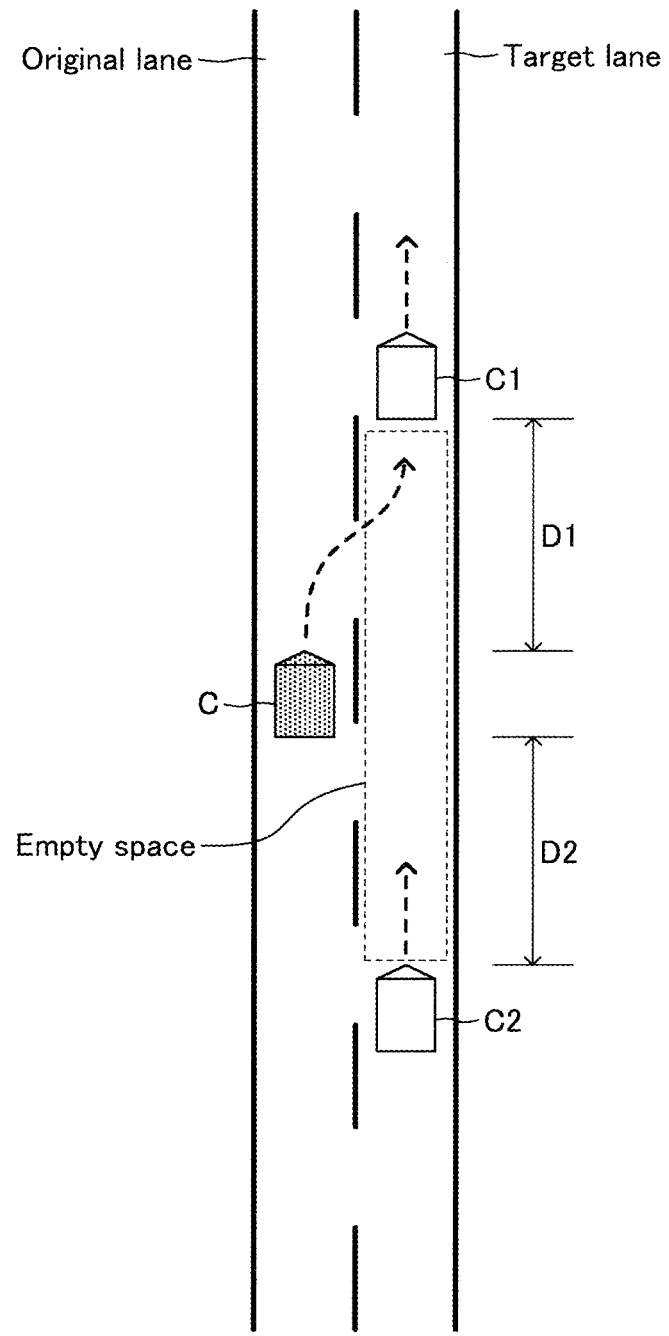
FIG. 4 is a top view diagram showing a relative position relationship between an own vehicle and another vehicle relevant to a lane change assist control.

In order to determine whether or not the condition (2) is satisfied, the drive support ECU 20 obtains a position of an object (specifically, an other vehicle) which is travelling in the target lane on the basis of the lane information provided from the camera sensor 21, and the target information provided from the vehicle surroundings monitoring apparatus 10. This is because, in order to perform a lane change from the original lane to the target lane, a sufficiently large empty space on the road is required to secure an appropriate distance between the own vehicle and the other vehicle traveling in the target lane. For example, as shown in FIG. 4, it is necessary to secure a sufficient (appropriate) distance for/as an inter-vehicular distance D1 between the own vehicle C and the other vehicle C1, and to secure a sufficient (appropriate) distance for/as an inter-vehicular distance D2 between the own vehicle C and the other vehicle C2.

In view of the above, for example, the drive support ECU 20 determines whether or not a relative distance between the own vehicle and an other vehicle traveling in the target lane is greater than a predetermined lane change acceptance distance on the basis of target information provided from the vehicle surroundings monitoring apparatus 10. If the relative distance is greater than the lane change acceptance distance, the drive support ECU 20 determines that the condition (2) is satisfied.

If the lane change assist start permission condition is satisfied, the drive support ECU 20 starts the lane change assist. At this time, the drive support ECU 20 figures out a target route of the own vehicle on the basis of lane information provided from the camera sensor 21 at the present time point. The target route is a route from the present position in the original lane to the central position of the target lane in the lateral direction (width direction) in order to complete the lane change.

During the performance of the lane change assist control, the drive support ECU 20 figures out a target steering angle sequentially such that the own vehicle travels on the target route, and sends the steering request which specifies the target steering angle to the EPS ECU 50 every time the target steering angle is updated. The EPS ECU 50 controls the steering motor 52 such that the actual steering angle coincides with the target steering angle. As a result, the own vehicle travels on the target route so that the lane change is performed. The drive support ECU 20 ends the lane change assist control when the drive support ECU 20 determines that the own vehicle reaches the final target position (namely, the central position of the target lane in the lateral direction) on the basis of lane information provided from the camera sensor 21 at the present time point. Further, during the performance of the lane change assist control, the drive support ECU 20 sends the winker blink request so as to make lamps corresponding to the turning direction blink among the winker lamps 31.

Thus far, the drive assist control which is performed by the drive support ECU 20 included in the drive support system 1 has been described. It should be noted that the above description regarding the drive assist control is a mere example and the drive support ECU 20 may be configured to perform any assist controls other than the drive assist control described above.

Here, a drive assist control which is performed without involving the drive support ECU 20 will be described. Each of the right BSM module 11RR and the left BSM module 11RL performs a BSM control independently.

A right indicator 16R is connected to the right BSM ECU 13RR. A left indicator 16L is connected to the left BSM ECU 13RL. For, example, the right indicator 16R is disposed at a partial region on the mirror surface of a right side mirror (a right side door mirror) of the own vehicle. The left indicator 16L is disposed at a partial region on the mirror surface of a left side mirror.

The right BSM ECU 13RR stores information about a "right side blind area" on the right side of the own vehicle. Meanwhile, the left BSM ECU 13RL stores information about a "left side blind area" on the left side of the own vehicle. The right side blind area is preconfigured to include a blind area in which the driver cannot see an object through the right side mirror in many cases. The left side blind area is preconfigured to include a blind area in which the driver cannot see an object through the left side mirror in many cases. For example, the right side blind area is defined as follows. The length of the right side blind area in the lateral direction is 3 meters. The distance in the lateral direction between the right end of the vehicle body and the left end of the right side blind area is 0.5 meters. The length of the right side blind area in the longitudinal direction is 5 meters. The distance in the longitudinal direction between the rear end of the vehicle body and the rear end of the right side blind area is 4 meters, and the rear end of the right side blind area is in the backward direction from the own vehicle. The left side blind area and the right side blind area are symmetrically arranged about the axis line Lc.

While the ignition switch is in the ON state, the right BSM ECU 13RR and the left BSM ECU 13RL perform the BSM control as described below. The right BSM ECU 13RR determines whether or not an other vehicle is present in the right side blind area on the basis of tridimensional object information provided by the backward right radar 12RR in order to detect a "caution requiring object." Specifically, if all or a part of the body of another vehicle is contained in (overlaps) the right side blind area, the right BSM ECU 13RR determines that an other vehicle is present in the right side blind area, and that other vehicle is the caution requiring object. In addition, the right BSM ECU 13RR determines whether or not an other vehicle (specifically, an other vehicle approaching from behind) will enter the right side blind area on the basis of tridimensional object information provided by the backward right radar 12RR within a predetermined time period. If an other vehicle is likely to enter the right side blind area within the time period, the right BSM ECU 13RR determines that other vehicle is the caution requiring object. Notably, the right BSM ECU 13RR performs this determination processing for each of other vehicles detected by the backward right radar 12RR, in consideration of the relative distance and the relative velocity between the own vehicle and the other vehicle, and a direction of the other vehicle to the own vehicle. Meanwhile the left BSM ECU 13RL also performs a similar determination processing so as to detect a caution requiring object on the basis of tridimensional object information provided by the backward left radar 12RL.

When the right BSM ECU 13RR detects a caution requiring object, the right BSM ECU 13RR lights the right indicator 16R. In this case, however, if the winker blink request for the right turn is been sending via the global bus 100 at that time, the right BSM ECU 13RR makes the right indicator 16R intermittently blink. Meanwhile, the left BSM ECU 13RL detects a caution requiring object, the left BSM ECU 13RL lights the left indicator 16L. In this case, however, if the winker blink request for the left turn is been sending via the global bus 100 at that time, the left BSM ECU 13RL makes the left indicator 16L intermittently blink. Accordingly, when the driver operates the winker lever so as to turn to a direction where the caution requiring object is present, an attention arousing level to the driver is increased.

Thus far, the BSM control has been described.

Regarding the vehicle surroundings monitoring apparatus 10, the front-side radar apparatus 10F is utilized for the forward collision warning control, and the rear-side radar apparatus 10R is utilized for the backward collision warning control. In addition, both the front-side radar apparatus 10F and the rear-side radar apparatus 10R are utilized for the lane change assist control. Further, the rear-side radar apparatus 10R is utilized for the BSM control.

Generally, the forward collision warning control and the BSM control are performed perpetually while the ignition switch is in the ON state. Therefore, the front-side radar apparatus 10F and the rear-side radar apparatus 10R operate to monitor surroundings at the same time. Namely, the radars 12 respectively disposed at four corners of the vehicle body (specifically, the forward right radar 12FR, the forward left radar 12FL, the backward right radar 12RR and the backward left radar 12RL) detects tridimensional objects at the same time.

As described above, two of the detection areas (two of the "radio wave transmission areas") of two of the radars from among the radars 12 which are adjacent to each other partially overlap with each other. That is, two of the detection areas Afr, Afl, Arr, and Arl, adjacent to each other, have an overlapping area. Since each of the radars 12 has common specifications, frequencies of the transmission signals (namely, the radio waves) transmitted from the radars 12 are equal to each other. Therefore, the radio waves interfere with each other where the radio wave transmission areas overlap with each other, and thus, the accuracy for detecting an object may degrade.

Figure 5:
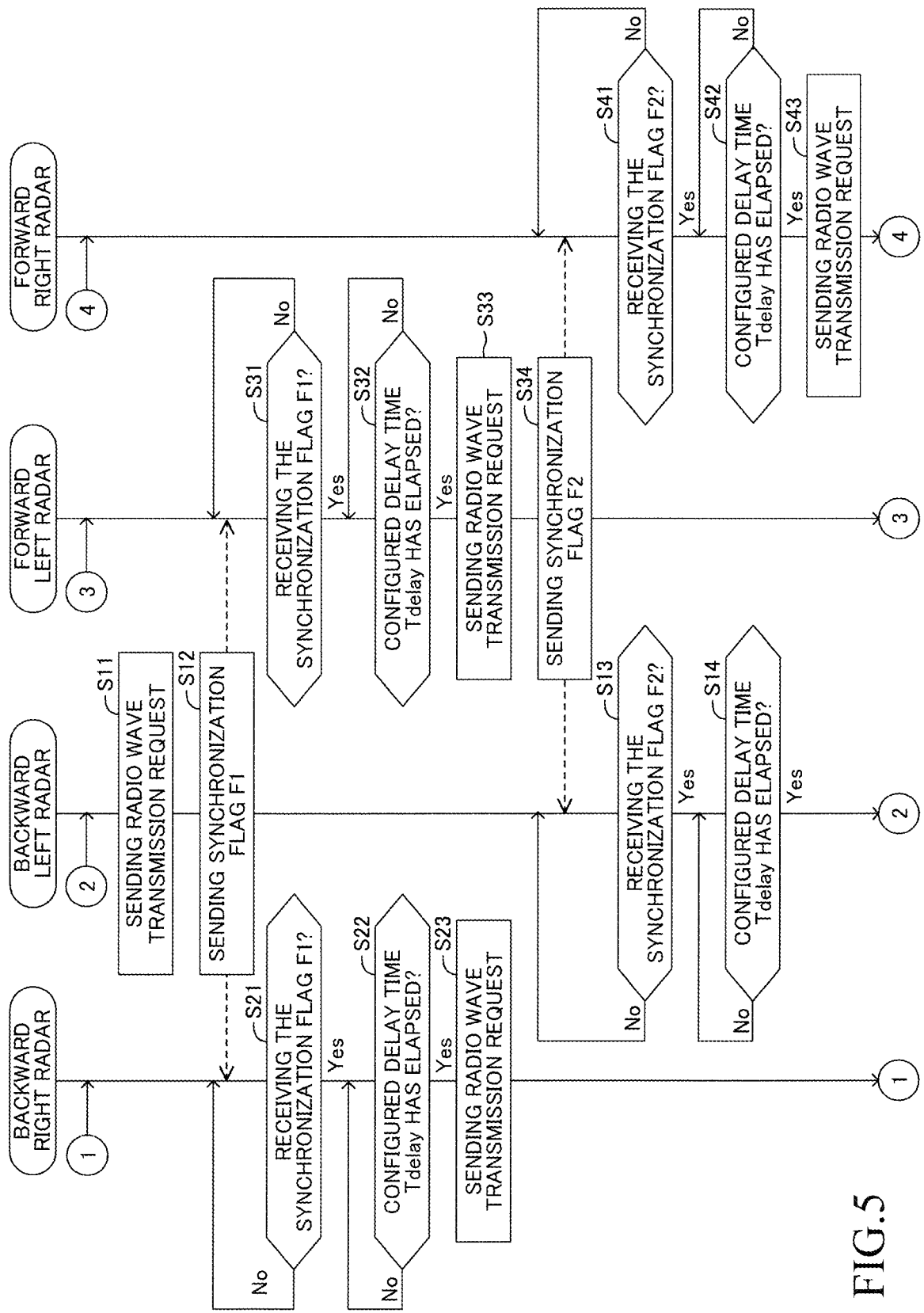
FIG. 5 is a flowchart representing radar transmission timing control routines.

In view of the above, the vehicle surroundings monitoring apparatus 10 according to the present embodiment prevent the interference of the radio waves by means of controlling the transmission timing of the radio waves from the radars 12 in cooperation and synchronization with each other. In order to achieve this control, each of the radar ECUs 13 cooperates with each other. Hereinafter, a "radar transmission timing control processing" which is performed by each of the radar ECUs 13 will be described. Flowcharts shown in FIG. 5 represent the radar transmission timing control routines executed by the radar ECUs 13. The leftmost flowchart shown in FIG. 5 represents a backward right radar transmission timing control routine executed by the right BSM ECU 13RR. The second flowchart from the left end shown in FIG. 5 represents a backward left radar transmission timing control routine executed by the left BSM ECU 13RL. The third flowchart from the left end shown in FIG. 5 represents a forward left radar transmission timing control routine executed by the left FSR ECU 13FL. The rightmost flowchart shown in FIG. 5 represents a forward right radar transmission timing control routine executed by the right FSR ECU 13FR. Each of the radar ECUs 13 starts executing each respective radar transmission timing control routines when the ignition switch becomes the ON state, and continues executing each respective radar transmission timing control routines while the ignition switch is in the ON state (until the ignition switch becomes the OFF state).

First, the backward left radar transmission timing control routine executed by the left BSM ECU 13RL will be described. When the backward left radar transmission timing control routine is stated, the left BSM ECU 13RL proceeds to step S11 so as to send a radio wave transmission request to the backward left radar 12RL. When the backward left radar 12RL receives the radio wave transmission request, the backward left radar 12RL transmits the transmission signal from the transmission antenna equipped with the transmission section of the backward left radar 12RL to the detection area Arl for a predetermined (fixed) transmission time Ton. Namely, the backward left radar 12RL continues transmitting the radio wave until the transmission time Ton elapses. The transmission time Ton is a fixed time and, for example, is 20 milliseconds. The backward left radar 12RL is configured to measure a time (time duration) from the start of the transmission of the radio wave (transmission signal) and stop transmitting the radio wave at a time point at which the measured time reaches the transmission time Ton. Alternatively, the left BSM ECU 13RL may be configured to measure the time (time duration) from the start of the transmission of the radio wave. In this case, the left BSM ECU 13RL sends a radio wave transmission stop request to the backward left radar 12RL at the time point at which the measured time reaches the transmission time Ton (that is, when the transmission time Ton has passed since the radio wave transmission request was sent).

Subsequently, the left BSM ECU 13RL proceeds to step S12 so as to send a synchronization flag F1 (i.e., a signal indicative of flag F1) to the right BSM ECU 13RR and to the left FSR ECU 13FL. The synchronization flag F1 is sent via the local bus 14R and the local bus 15. The synchronization flag F1 is for synchronizing the operations of the radars 12.

Meanwhile, when the backward right radar transmission timing control routine is started, the right BSM ECU 13RR proceeds to step S21 so as to determine whether or not the right BSM ECU 13RR has received the synchronization flag F1. The right BSM ECU 13RR repeats this processing until the synchronization flag F1 is received. When the right BSM ECU 13RR receives the synchronization flag F1 sent from the left BSM ECU 13RL (S21: Yes), the right BSM ECU 13RR proceeds to step S22 so as to wait until a predetermined delay time Tdelay elapses after the reception of the synchronization flag F1. It should be noted that a history indicating that the synchronization flag F1 was received is deleted at step S23. This delay time Tdelay is as long as the transmission time Ton, and, in this example, is 20 milliseconds. Since the synchronization flag F1 is sent at the same time when the left BSM ECU 13RL sends the radio wave transmission request to the backward left radar 12RL, the right BSM ECU 13RR receives the synchronization flag F1 at the same time when the backward left radar 12RL starts transmitting the radio wave.

When a predetermined delay time Tdelay has elapsed since the right BSM ECU 13RR received the synchronization flag F1 (S22: Yes), the right BSM ECU 13RR proceeds to step S23 so as to send the radio wave transmission request to the backward right radar 12RR. When the backward right radar 12RR receives the radio wave transmission request, the backward right radar 12RR transmits the transmission signal from the transmission antenna equipped with the transmission section of the backward right radar 12RR to the detection area Arr for a predetermined transmission time Ton. Namely, the backward right radar 12RR continues transmitting the radio wave until the transmission time Ton elapses. This transmission time Ton is as the same as the above-described transmission time Ton for the backward left radar 12RL. The backward right radar 12RR is configured to measure a time (time duration) from the start of the transmission of the radio wave (transmission signal) and stop transmitting the radio wave at a time point at which the measured time reaches the transmission time Ton. Alternatively, the right BSM ECU 13RR may be configured to measure the time (time duration) from the start of the transmission of the radio wave. In this case, the right BSM ECU 13RR sends a radio wave transmission stop request to the backward right radar 12RR at the time point at which the measured time reaches the transmission time Ton (that is, when the transmission time Ton has passed since the radio wave transmission request was sent).

Since the delay time Tdelay is set to the same value as the value of the transmission time Ton, the backward right radar 12RR starts transmitting the radio wave at the same time when the backward left radar 12RL stops transmitting the radio wave.

The right BSM ECU 13RR returns to step S21 after sending the radio wave transmission request to the backward right radar 12RR at step S23 so as to repeat the above-described processing.

Meanwhile, when the forward left radar transmission timing control routine is started, the left FSR ECU 13FL proceeds to step S31 so as to determine whether or not the left FSR ECU 13FL has received the synchronization flag F1. The left FSR ECU 13FL repeats this processing until the synchronization flag F1 is received. When the left FSR ECU 13FL receives the synchronization flag F1 sent from the left BSM ECU 13RL (S31: Yes), the left FSR ECU 13FL proceeds to step S32 so as to wait until a predetermined delay time Tdelay elapses after the reception of the synchronization flag F1. It should be noted that a history indicating that the synchronization flag F1 was received is deleted at step S32. This delay time Tdelay is as long as the transmission time Ton, and, in this example, is 20 milliseconds. Since the synchronization flag F1 is sent at the same time when the left BSM ECU 13RL sends the radio wave transmission request to the backward left radar 12RL, the left FSR ECU 13FL receives the synchronization flag F1 at the same time when the backward left radar 12RL starts sending the radio wave.

When a predetermined delay time Tdelay has elapsed since the left FSR ECU 13FL received the synchronization flag F1 (S32: Yes), the left FSR ECU 13FL proceeds to step S33 so as to send the radio wave transmission request to the forward left radar 12FL. When the forward left radar 12FL receives the radio wave transmission request, the forward left radar 12FL transmits the transmission signal from the transmission antenna equipped with the transmission section of the forward left radar 12FL to the detection area Afl for a predetermined transmission time Ton. Namely, the forward left radar 12FL continues transmitting the radio wave until the transmission time Ton elapses. This transmission time Ton is the same as the above-described transmission time Ton for the backward left radar 12RL and the backward right radar 12RR. The forward left radar 12FL is configured to measure a time (time duration) from the start of the transmission of the radio wave (transmission signal) and stop transmitting the radio wave at a time point at which the measured time reaches the transmission time Ton. Alternatively, the left FSR ECU 13FL may be configured to measure the time (time duration) from the start of the transmission of the radio wave. In this case, the left FSR ECU 13FL sends a radio wave transmission stop request to the forward left radar 12FL at the time point at which the measured time reaches the transmission time Ton (that is, when the transmission time Ton has passed since the radio wave transmission request was sent).

Since the delay time Tdelay is set to the same value as the value of the transmission time Ton, the forward left radar 12FL starts transmitting the radio wave at the same time when the backward left radar 12RL stops transmitting the radio wave.

Subsequently, the left FSR ECU 13FL proceeds to step S34 so as to send synchronization flag F2 (i.e., a signal indicative of flag F2) to the left BSM ECU 13RL and the right FSR ECU 13FR. In common with the synchronization flag F1, the synchronization flag F2 is sent via the local bus 14F and the local bus 15. The synchronization flag F2 is for synchronizing the operations of the radars 12. The left FSR ECU 13FL returns to step S31 after sending the synchronization flag F2 at step S34 so as to repeat the above-mentioned processing.

Figure 6:
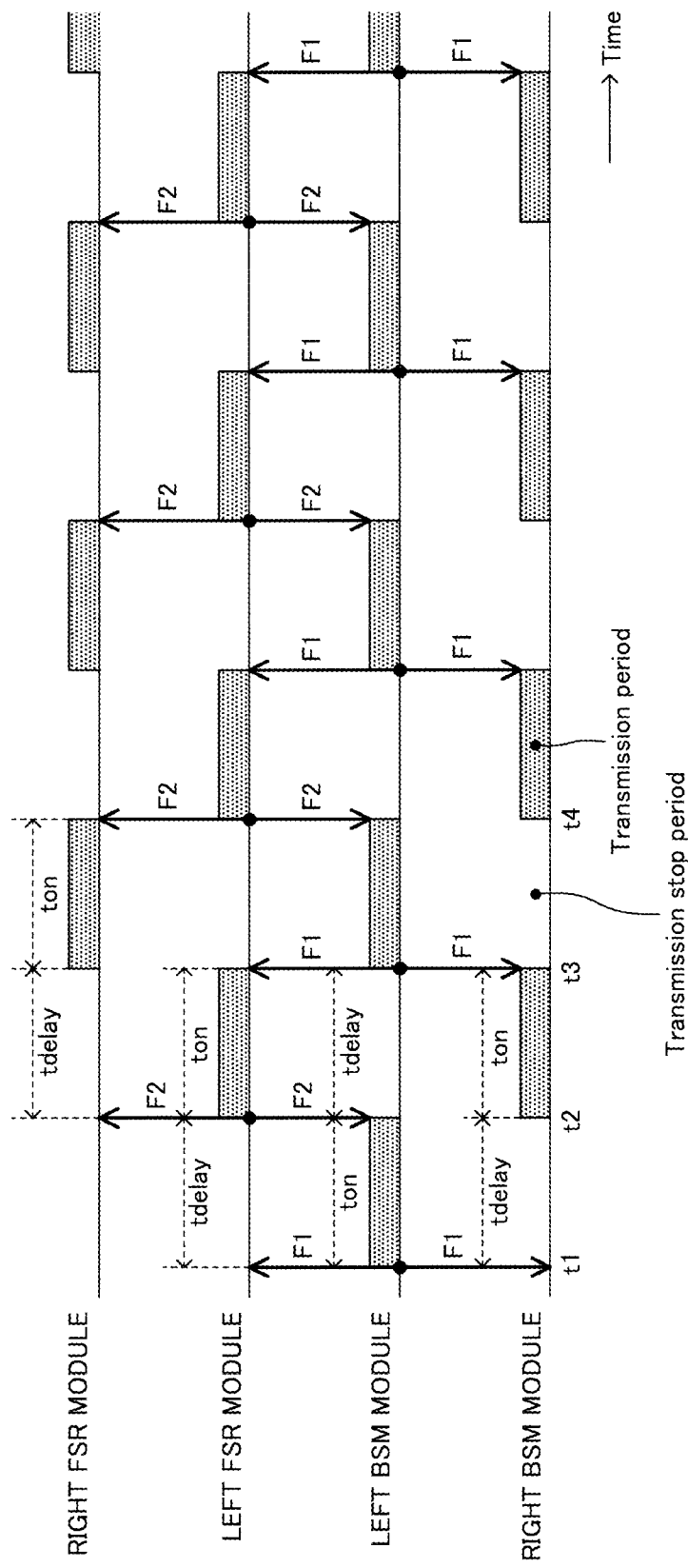
FIG. 6 is a timing diagram representing transmission periods, transmission stop periods, and sending timings of synchronization flags.

FIG. 6 is a timing diagram representing (depicting) the transmission periods in which the transmission signals are sent from the radars 12, and the transmission stop periods in which the transmission signals are not sent from the radars 12. FIG. 6 also represents (depicts) the timings when the synchronization flag F1 and the synchronization flag F2 are sent. Names of the right FSR module 11FR, the left FSR module 11FL, the left BSM module 11RL, and the right BSM module 11RR are written on the leftmost side of the diagram. The transmission periods are shown in FIG. 6 as gray areas. In addition, arrows shown in FIG. 6 represent transmission timings, sources and destinations of the synchronization flag F1 or the synchronization flag F2. Black filled circles connected to the arrows represent the sources, and end points (wedge-shaped ends) of the arrows represent the destinations. The uppermost chart in FIG. 6 represents the transmission periods and the transmission stop periods of the forward right radar 12FR. The second chart from the top represents the transmission periods and the transmission stop periods of the forward left radar 12FL. The third chart from the top represents the transmission periods and the transmission stop periods of the backward left radar 12RL. The bottommost chart represents the transmission periods and the transmission stop periods of the backward right radar 12RR.

The left BSM ECU 13RL sends the radio wave transmission request to the backward left radar 12RL at a time point t1 (step S11). As the result, the backward left radar 12RL starts transmitting the radio wave at the time point t1. At the same time (time point t1), the left BSM ECU 13RL sends the synchronization flag F1 to the right BSM ECU 13RR and the left FSR ECU 13FL (step S12).

The backward left radar 12RL stops transmitting the radio wave at a time point t2 when the transmission time Ton (=the delay time Tdelay) has passed since the time point t1. At the same time (time point t2), the right BSM ECU 13RR sends the radio wave transmission request to the backward right radar 12RR (step S23) and the left FSR ECU 13FL sends the radio wave transmission request to the forward left radar 12FL (step S33). As a result, transmitting the radio waves is started by the backward right radar 12RR and the forward left radar 12FL at the time point t2.

In addition, at the time point t2, the left FSR ECU 13FL sends the synchronization flag F2 to the left BSM ECU 13RL and the right FSR ECU 13FR.

Referring back to FIG. 5, after the left BSM ECU 13RL sends the synchronization flag F1 at step S12 of the backward left radar transmission timing control routine, the left BSM ECU 13RL proceeds to step S13 so as to determine whether or not the left BSM ECU 13RL has received the synchronization flag F2. This synchronization flag F2 is sent from the left FSR ECU 13FL.

As described above, the synchronization flag F2 is sent when the delay time Tdelay has elapsed since the left FSR ECU 13FL received the synchronization flag F1. In addition, the delay time Tdelay is as long as the transmission time Ton. Therefore, the left BSM ECU 13RL receives the synchronization flag F2 at the same time when the backward left radar 12RL stops transmitting the radio wave.

When the left BSM ECU 13RL receives the synchronization flag F2 (S13: Yes), the left BSM ECU 13RL proceeds to step S14 so as to wait until a predetermined delay time Tdelay elapses after the reception of the synchronization flag F2. It should be noted that a history indicating that the synchronization flag F2 was received is deleted at step S14. This delay time Tdelay is also as long as the transmission time Ton (is set to the same value the value of the transmission time Ton) (e.g., 20 milliseconds).

When the delay time Tdelay has elapsed since the left BSM ECU 13RL received the synchronization flag F2 (S14: Yes), the left BSM ECU 13RL returns to step S11 so as to repeat the above-described processing. As a result, the backward left radar 12RL starts sending the radio wave (step S11).

For example, after the left BSM ECU 13RL receives the synchronization flag F2 at the time point t2 shown in FIG. 6, the left BSM ECU 13RL sends the radio wave transmission request to the backward left radar 12RL at a time point t3 when the delay time Tdelay has passed since the time point t2. As a result, the backward left radar 12RL start transmitting the radio wave again at the time point t3. At the same time (time point t3), the left BSM ECU 13RL sends the synchronization flag F1 to the right BSM ECU 13RR and the left FSR ECU 13FL (step S12).

Referring back to FIG. 5 again, when the forward right radar transmission timing control routine is started, the right FSR ECU 13FR proceeds to step S41 so as to determine whether or not the right FSR ECU 13FR has received the synchronization flag F2. This synchronization flag F2 is sent by the left FSR ECU 13FL at step S34. The right FSR ECU 13FR repeats this processing until the synchronization flag F2 is received. When the right FSR ECU 13FR receives the synchronization flag F2 (S41: Yes), the right FSR ECU 13FR proceeds to step S42 so as to wait until a predetermined delay time Tdelay elapses after the reception of the synchronization flag F2. It should be noted that a history indicating that the synchronization flag F2 was received is deleted at step S42. This delay time Tdelay is set to the same value as the value of the transmission time Ton. Since the synchronization flag F2 is sent at the same time when the left FSR ECU 13FL sends the radio wave transmission request to the forward left radar 12FL, the right FSR ECU 13FR receives the synchronization flag F2 at the same time when the forward left radar 12FL starts transmitting the radio wave.

When the predetermined delay time Tdelay has elapsed since the right FSR ECU 13FR received the synchronization flag F2 (S42: Yes), the right FSR ECU 13FR proceeds to step S43 so as to send the radio wave transmission request to the forward right radar 12FR. When the forward right radar 12FR receives the radio wave transmission request, the forward right radar 12FR transmits the transmission signal from the transmission antenna equipped with the transmission section of the forward right radar 12FR to the detection area Afr for the predetermined transmission time Ton. Namely, the forward right radar 12FR continues transmitting the radio wave until a transmission time Ton elapses. This transmission time Ton is the same as the above-described transmission time Ton for each of the radars other than the forward right radar 12FR among the radars 12 (specifically, the forward left radar 12FL, the backward right radar 12RR, and the backward left radar 12RL). The forward right radar 12FR is configured to measure a time (time duration) from the start of the transmission of the radio wave (transmission signal) and stop transmitting the radio wave at a time point at which the measured time reaches the transmission time Ton. Alternatively, the right FSR ECU 13FR may be configured to measure the time (time duration) from the start of the transmission of the radio wave. In this case, the right FSR ECU 13FR sends a radio wave transmission stop request to the forward right radar 12FR at the time point at which the measured time reaches the transmission time Ton (that is, when the transmission time Ton has passed since the radio wave transmission request was sent).

The right FSR ECU 13FR returns to step S41 after sending the radio wave transmission request to the forward right radar 12FR at step S43 so as to repeat the above-described processing.

For example, the synchronization flag F2 is sent from the left FSR ECU 13FL to the right FSR ECU 13FR at the time point t2 shown in FIG. 6. The right FSR ECU 13FR sends the radio wave transmission request to the forward right radar 12FR at the time point t3, when the delay time Tdelay has passed since the time point t2. As a result, the forward right radar 12FR starts transmitting the radio wave to the detection area Afr at the time point t3. After that, the forward right radar 12FR stops transmitting the radio wave at a time point t4 when the transmission time Ton has passed since the time point t3.

Each of the radar transmission timing control routines is repeatedly executed as described above by each respective one of the radar ECUs 13 in the vehicle surroundings monitoring apparatus 10.

As described, according to the vehicle surroundings monitoring apparatus 10, the forward right radar 12FR and the backward left radar 12RL perform the operations for alternately repeating the transmission periods and the transmission stop periods synchronously (and simultaneously) at the predetermined interval (cycle) which is equal to the sum (=Ton+Tdelay) of the transmission time Ton and the delay time Tdelay. Similarly, the forward left radar 12FL and the backward right radar 12RR also perform the operations for alternately repeating the transmission periods and the transmission stop periods synchronously (and simultaneously) at the predetermined interval (cycle) (=Ton+Tdelay).

The forward right radar 12FR and the backward left radar 12RL are arranged at the diagonal positions of the vehicle body of the own vehicle. A pair of the forward right radar 12FR and the backward left radar 12RL correspond to the first diagonal radars of the present invention. Hereinafter, the pair of the forward right radar 12FR and the backward left radar 12RL will be also collectively referred to as the first diagonal radars. Each of the first diagonal radars performs the operations for alternately repeating the transmission period and the transmission stop period synchronously (and simultaneously) at the predetermined interval (cycle).

Similarly, the forward left radar 12FL and the backward right radar 12RR are also arranged at the diagonal positions of the vehicle body. A pair of the forward left radar 12FL and the backward right radar 12RR corresponds to the second diagonal radars of the present invention. Hereinafter, the forward left radar 12FL and the backward right radar 12RR will be also collectively referred to as the second diagonal radars. Each of the second diagonal radars performs the operations for alternately repeating the transmission period and the transmission stop period synchronously (and simultaneously) at the predetermined interval (cycle).

The transmission period of the first diagonal radars and the transmission period of the second diagonal radars are alternately arranged. Specifically, when the first diagonal radars transmit the radio waves, the second diagonal radars do not transmit the radio waves. On the other hand, when the first diagonal radars do not transmit the radio waves, the second diagonal radars transmit the radio waves. Namely, the transmission period of the first diagonal radars and the transmission period of the second diagonal radars do not overlap with each other. In other words, the transmission period of the first diagonal radars and the transmission period of the second diagonal radars are mutually exclusive.

The transmission period of the first diagonal radars corresponds to the first transmission period of the present invention. The transmission stop period of the first diagonal radars corresponds to the first transmission stop period of the present invention. Meanwhile, the transmission period of the second diagonal radars corresponds the second transmission period of the present invention. The transmission stop period of the second diagonal radars corresponds to the second transmission stop period of the present invention. The first transmission period, the first transmission stop period, the second transmission period, and the second transmission stop period are as long as each other (or the same length time duration as each other).

Figure 7:
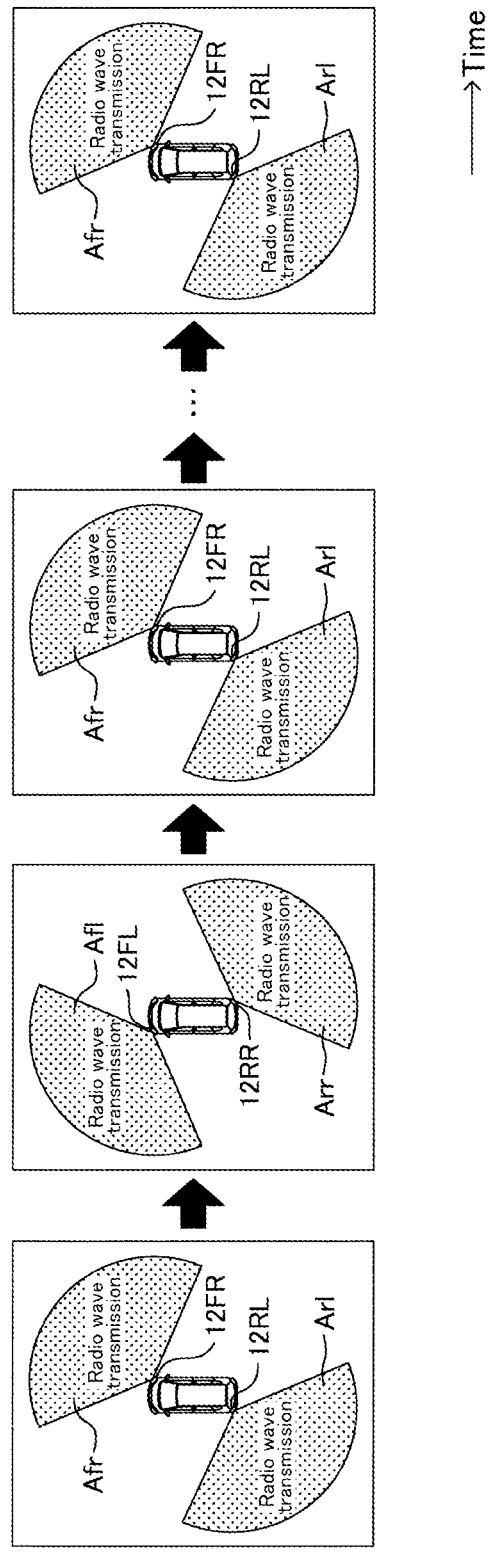
FIG. 7 is an explanatory drawing representing a state of the alternate switching of radio wave transmission areas.

Namely, according to the vehicle surroundings monitoring apparatus of the present embodiment, as shown in FIG. 7, the transmission of the radio waves by the first diagonal radars and the transmission of the radio waves by the second diagonal radars are alternately performed at the predetermined interval (cycle). Therefore, the interference between the radio waves transmitted from the two radars adjacent to each other in the lateral direction or in the longitudinal direction is avoided. As a result, the degradation (deterioration) of the accuracy for detecting an object (e.g., an other vehicle) is prevented. In addition, in the present embodiment, the radars 12 (namely, the four radars) are divided into two groups, and the transmission periods which are mutually exclusive to each other are assigned for each of the two groups. Therefore, the time duration for completing the transmission of the radio waves by all of the radars 12 becomes shorter compared with a comparable case where the transmission periods which are mutually exclusive to each other are assigned for each of the four radars. In other words, the present embodiment can shorten an interval between the consecutive transmission periods of each of the radars 12 as compared with the comparable case. Consequently, the time duration (the detecting duration) for detecting an object around the own vehicle by the radars 12 does not become excessively long.

Further, in the present embodiment, the first diagonal radars continue transmitting the radio waves during/over the period when the second diagonal radars do not transmit the radio waves, and the second diagonal radars continue transmitting the radio waves during/over the period when the first diagonal radars do not transmit the radio waves. Consequently, the present embodiment can more effectively shorten the interval between the consecutive transmission periods of each of the radars 12 (or the case where the detecting duration becomes excessively long can be more effectively avoided).

In addition, the synchronization among the radars 12 is performed accurately by simple processes using the synchronization flag F1 and the synchronization flag F2. Further, neither the synchronization flag F1 nor the synchronization flag F2 is sent via the global bus 100, but they are sent via the local bus 14R, the local bus 14F, or the local bus 15. Therefore, an increase of traffic on the global bus 100, via which a large amount of communication is conducted, due to sending the synchronization flag F1 and the synchronization flag F2 is avoided.

The embodiment of the vehicle surroundings monitoring apparatus according to the present invention has been described, however, the present invention is not limited to the above-described embodiment, and various modifications are possible without departing from the scope of the invention.

Figure 8:
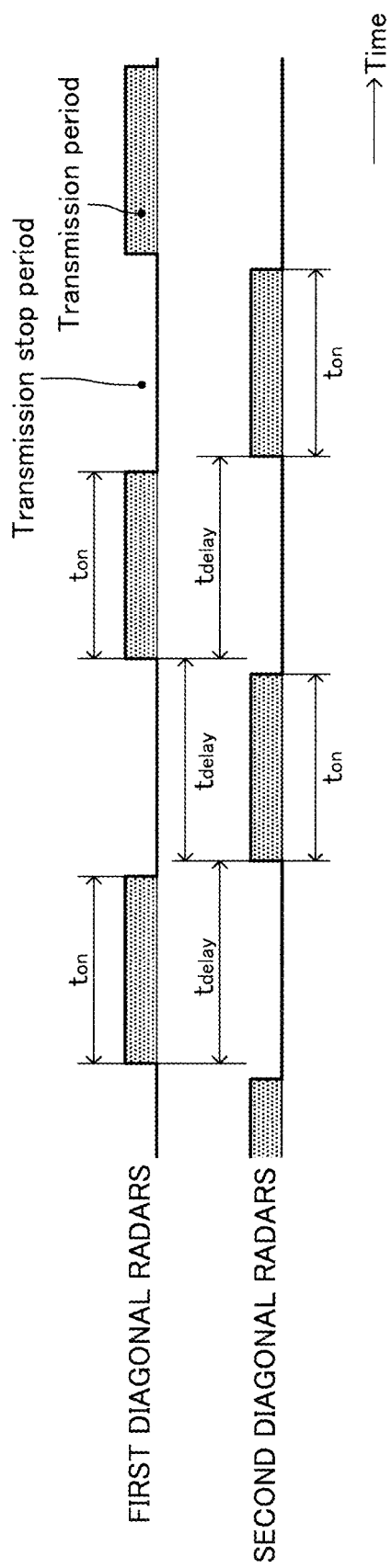
FIG. 8 is a timing diagram representing transmission periods, transmission stop periods according to a variation.
Figure 9A:
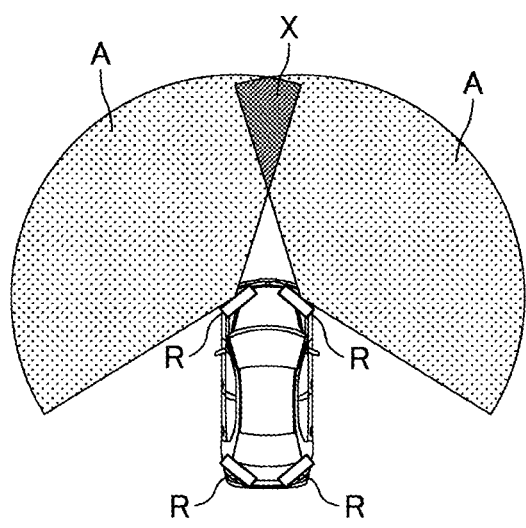
FIG. 9A is an explanatory drawing representing the interfere of radio waves.
Figure 9B:
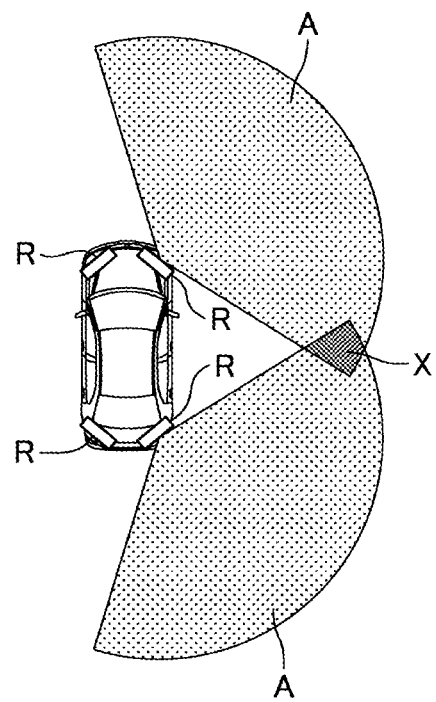
FIG. 9B is another explanatory drawing representing the interfere of the radio waves.

For example, in the present embodiment, the transmission period of the first diagonal radars coincides (completely matches) with the transmission stop period of the second diagonal radars, and the transmission stop period of the first diagonal radars coincides (completely matches) with the transmission period of the second diagonal radars. However, in some embodiments, there is a time period when neither the first diagonal radars nor the second diagonal radars transmit the radio waves, as long as the transmission period of the first diagonal radars does not overlap with the transmission period of the second diagonal radars. In one instance, as show in FIG. 8, the delay time Tdelay may be set to a value (length) which is slightly longer than the transmission time Ton to provide the time period when neither the first diagonal radars nor the second diagonal radars transmit the radio waves.

In addition, in the present embodiment, the left BSM ECU 13RL sends the synchronization flag F1 at the same time when the left BSM ECU 13RL sends the radio wave transmission request. However, in some embodiments, the left BSM ECU 13RL sends the synchronization flag F1 at any time determined based on (or associated with) the timing of transmitting the radio wave by the backward left radar 12RL, which is controlled by the left BSM ECU 13RL. For example, in some embodiments, the left BSM ECU 13RL sends the synchronization flag F1 when a predetermined margin time (specifically, a predetermined (fixed) margin time which is shorter than the delay time Tdelay) has elapsed since the left BSM ECU 13RL sent the radio wave transmission request. In this case, the delay time Tdelay may be set to a value which is shorter than the transmission time Ton by the margin time. Similarly, in some embodiments, the left FSR ECU 13FL sends the synchronization flag F2 at any time determined based on (or associated with) the timing of transmitting the radio wave by the forward left radar 12FL, which is controlled by the left FSR ECU 13FL.

In addition, in the present embodiment, the left BSM ECU 13RL, which controls the timing of transmitting the radio wave from one of the first diagonal radars, sends the synchronization flag F1 to the left FSR ECU 13FL and the right BSM ECU 13RR, which control the timings of transmitting the radio waves from the second diagonal radars. However, in some embodiments, the right FSR ECU 13FR, which controls the timing of transmitting the radio wave from the other of the first diagonal radars, sends the synchronization flag F1 to the left FSR ECU 13FL and the right BSM ECU 13RR. Meanwhile, in the present embodiment, the left FSR ECU 13FL, which controls the timing of transmitting the radio wave from one of the second diagonal radars, sends the synchronization flag F2 to the left BSM ECU 13RL and the right FSR ECU 13FR, which control the timings of transmitting the radio waves from the first diagonal radars. However, in some embodiments, the right BSM ECU 13RR, which controls the timing of transmitting the radio wave from the other of the second diagonal radars, sends the synchronization flag F2 to the left BSM ECU 13RL and the right FSR ECU 13FR. In these cases, preferably, the synchronization flag F1 and the synchronization flag F2 are sent via a local bus which connects the right FSR ECU 13FR and the right BSM ECU 13RR.

Further, the vehicle surroundings monitoring apparatus 10 comprises a front radar which is disposed at the central front end of the vehicle body (for example, at the central position in the lateral direction of the front bumper) in addition to the radars 12. In this case, the drive support ECU 20 may perform a collision avoidance control using at least the front radar. The collision avoidance control is a control for generating a warning to the driver and for generating the frictional brake force automatically as needed so as to avoid a collision with a tridimensional object detected using at least the front radar when the probability that the own vehicle collides with the tridimensional object becomes high. In this case, preferably, the front radar is configured to transmit a radio wave whose frequency is different from those of the radars 12 (so as to prevent the interference between the radio wave from the front radar and the radio waves radars other than the frond radar).

What is claimed is:

1. A vehicle surroundings monitoring apparatus comprising:
four radars including a forward right radar, a forward left radar, a backward right radar, and a backward left radar, each of the radars performing object detection in a respective detection area around a vehicle by transmitting a radio wave and receiving a reflection wave generated as a result of reflection by an object of the transmitted radio wave, the forward right radar being disposed at a front right corner part of a body of the vehicle, the forward left radar being disposed at a front left corner part of the body, the backward right radar being disposed at a rear right corner part of the body, and the backward left radar being disposed at a rear left corner part of the body; and
a processor configured to:
control first diagonal radars including the forward right radar and the backward left radar to perform an operation of alternating, at a predetermined interval, a first transmission period for which each of the first diagonal radars transmits the radio wave in a synchronized manner and a first transmission stop period for which each of the first diagonal radars does not transmit the radio wave, and
control second diagonal radars including the forward left radar and the backward right radar to perform an operation of alternating, at the predetermined interval, a second transmission period for which each of the second diagonal radars transmits a radio wave in a synchronized manner and a second transmission stop period for which each of the second diagonal radars does not transmit the radio wave, in such a manner that the first transmission period and the second transmission period do not overlap each other.

2. The vehicle surroundings monitoring apparatus according to claim 1, wherein said processor is configured to
set said first transmission period and said first transmission stop period to be equal in length to each other;
set said second transmission stop period in such a manner that the second transmission stop period overlaps completely with the first transmission period; and
set a second transmission period in such a manner that the second transmission period overlaps completely with the first transmission stop period.

3. The vehicle surroundings monitoring apparatus according to claim 2, wherein said processor is configured to:
control radio wave transmission of said forward right radar;
control radio wave transmission of said forward left radar;
control radio wave transmission of said backward right radar; and
control radio wave transmission of said backward left radar, and wherein,
send a first synchronization signal to the forward left radar and the backward right radar at a timing associated with a start timing of radio wave transmission of the backward right radar;
each of the forward left radar and the backward right radar is configured to determine a start timing of radio wave transmission radar based on a reception timing of the first synchronization signal;
one of the forward left radar and the backward right radar is configured to send a second synchronization signal to the forward right radar and the backward left radar at a timing associated with a start timing of radio wave transmission of the one of the forward left radar and the backward right radar; and
each of the forward right radar and the backward left radar is configured to determine a start timing of radio wave transmission based on a reception timing of the second synchronization signal.

4. The vehicle surroundings monitoring apparatus according to claim 1, wherein said processor is configured to:
control radio wave transmission of said forward right radar;
control radio wave transmission of said forward left radar;
control radio wave transmission of said backward right radar; and
control radio wave transmission of said backward left radar, and wherein,
the backward right radar is configured to: send a first synchronization signal to the forward left radar and the backward right radar at a timing associated with a start timing of radio wave transmission of the backward right radar;

each of the forward left radar and the backward right radar is configured to determine a start timing of radio wave transmission based on a reception timing of the first synchronization signal;

one of the forward left radar and the backward right radar is configured to send a second synchronization signal to the forward right radar and the backward left radar at a timing associated with a start timing of radio wave transmission of the one of the forward left radar and the backward right radar; and each of the forward right radar and the backward left radar is configured to determine a the start timing of radio wave transmission based on a reception timing of the second synchronization signal.

5. The vehicle surroundings monitoring apparatus according to claim 1, wherein the backward right radar is configured to: send a first synchronization signal to the forward left radar and the backward right radar at a timing associated with a start timing of radio wave transmission of the backward right radar.

6. The vehicle surroundings monitoring apparatus according to claim 1, wherein one of the four radars of one of the groups is configured to: send a first synchronization signal to each of the radars of the other group at a timing associated with a start timing of radio wave transmission of the one of the four radars of the one of the groups.

7. The vehicle surroundings monitoring apparatus according to claim 1, wherein each of the four radars is configured to delay a start timing of radio wave transmission based on receiving the synchronization information, and transmit the synchronization information for causing the delay to another radar that has an overlapping detection area.

8. A vehicle surroundings monitoring method comprising:
controlling, by a processor, a communication interface to transmit a radio wave transmission request to a first one of four radars, wherein the four radars include a forward right radar, a forward left radar, a backward right radar, and a backward left radar, each of the four radars performing object detection in a respective detection area around a vehicle by transmitting a radio wave and receiving a reflection wave generated as a result of reflection by a real object, the forward right radar being disposed at a front right corner part of a body of the vehicle, the forward left radar being disposed at a front left corner part of the body, the backward right radar being disposed at a rear right corner part of the body, and the backward left radar being disposed at a rear left corner part of the body; and based on receiving a radio wave transmission request, performing, by at least one of the radars of each group of two radar groups, the following operations: (i) controlling timing of performance of a radar operation in accordance with a first transmission period, and (ii) send synchronization information regarding the first transmission period to at least one of the radars of a group of two groups that is different from the group of the two groups the sending radar belongs to, wherein
the four radars include two groups including a first diagonal radars group including the forward right radar and the backward left radar, and a second diagonal radars group including the forward left radar and the backward right radar, and
the radio wave transmission request includes the first transmission period for which each radar of the first diagonal radars group transmits the radio wave in a synchronized manner.

9. The vehicle surroundings monitoring method according to claim 8, further comprising sending, by one of the four radars of one of the groups, a first synchronization signal to each of the radars of the other group at a timing associated with a start timing of radio wave transmission of the one of the four radars of the one of the groups.

10. The vehicle surroundings monitoring method according to claim 8, further comprising: delaying, by one or more of the four radars, a start timing of radio wave transmission based on respective receiving of the synchronization information, and transmitting the synchronization information for causing the delay to another radar that has an overlapping detection area.

* * * * *